(12) United States Patent
Song et al.

(10) Patent No.: US 12,227,328 B2
(45) Date of Patent: Feb. 18, 2025

(54) STRAP-SEGMENT-CUTTING SYSTEM

(71) Applicant: Signode Industrial Group LLC, Tampa, FL (US)

(72) Inventors: Bongcheon Song, Daejeon (KR); Yongho Shin, Gyeongsangnam-do (KR); Junyeong Kim, Busan (KR); Taewon Kang, Busan (KR)

(73) Assignee: SIGNODE INDUSTRIAL GROUP LLC, Tampa, FL (US)

( * ) Notice: Subject to any disclaimer, the term of this patent is extended or adjusted under 35 U.S.C. 154(b) by 89 days.

(21) Appl. No.: 17/757,737

(22) PCT Filed: Dec. 15, 2020

(86) PCT No.: PCT/US2020/065067
§ 371 (c)(1),
(2) Date: Jun. 20, 2022

(87) PCT Pub. No.: WO2021/138046
PCT Pub. Date: Jul. 8, 2021

(65) Prior Publication Data
US 2023/0312155 A1  Oct. 5, 2023

(30) Foreign Application Priority Data

Dec. 31, 2019  (KR) .................. 10-2019-0179254

(51) Int. Cl.
B65B 69/00 (2006.01)
(52) U.S. Cl.
CPC ................ B65B 69/0025 (2013.01)

(58) Field of Classification Search
CPC ... B65B 69/0025; Y10S 83/909; Y10T 83/343
USPC ...................................... 53/492; 83/175, 515
See application file for complete search history.

(56) References Cited

U.S. PATENT DOCUMENTS

| 3,757,622 | A |  | 9/1973 | Berry |
| 5,156,516 | A | * | 10/1992 | Boisseau ............. B65B 69/0025 414/412 |
| 7,832,246 | B2 |  | 11/2010 | Spaans et al. |
| 7,913,599 | B2 |  | 3/2011 | Spaans et al. |
| 2007/0044603 | A1 | * | 3/2007 | Scholtes ............. B65B 69/0025 83/72 |
| 2021/0213638 | A1 |  | 7/2021 | Czaja et al. |

FOREIGN PATENT DOCUMENTS

| AR | 025786 A1 | 12/2002 |
| CN | 101734391 A | 6/2010 |
| CN | 101844664 A | 9/2010 |

(Continued)

OTHER PUBLICATIONS

"RCU CHP-130 Brochure", Signode's Robot Strap Cutting Machine (RCU), 2016.

(Continued)

*Primary Examiner* — Robert F Long
*Assistant Examiner* — Xavier A Madison
(74) *Attorney, Agent, or Firm* — Neal, Gerber & Eisenberg LLP

(57) ABSTRACT

The present disclosure relates to a strap-segment-cutting system for locating and removing strap segments from an object, such as a metal coil.

15 Claims, 30 Drawing Sheets

(56) References Cited

FOREIGN PATENT DOCUMENTS

| | | |
|---|---|---|
| CN | 109229672 A | 1/2019 |
| CN | 113474096 A | 10/2021 |
| EP | 3581508 A1 | 12/2019 |
| FR | 3060538 A1 | 6/2018 |
| JP | S57125116 A | 8/1982 |
| JP | S57204839 A | 12/1982 |
| JP | S57209161 A | 12/1982 |
| JP | S60153714 U | 10/1985 |
| JP | H0541628 U | 6/1993 |
| JP | 4379892 B2 | 10/2009 |
| JP | 2010001061 A | 1/2010 |
| JP | 5096828 B2 | 9/2012 |
| JP | 5891574 B2 | 3/2016 |
| JP | 6110970 B1 | 3/2017 |
| JP | 6151392 B1 | 6/2017 |
| JP | 2017149469 A | 8/2017 |
| JP | 6228587 B2 | 10/2017 |
| KR | 100875758 B1 | 12/2008 |
| KR | 20170127834 A | 11/2017 |
| KR | 101836441 B1 | 3/2018 |
| KR | 102027492 B1 | 10/2019 |

OTHER PUBLICATIONS

"International Search Report and Written Opinion", from corresponding PCT Application No. PCT/US2020/065067, Mar. 18, 2021.

"First Office Action with English translation", from corresponding Chinese Patent Application No. 202080091496.1, Oct. 28, 2023.

"Communication pursuant to Article 94(3) EPC", in corresponding European Patent Application No. 20838846.2, Aug. 28, 2024.

"Office Action", from corresponding Japanese patent application No. 2022-539080, Nov. 7, 2024.

* cited by examiner

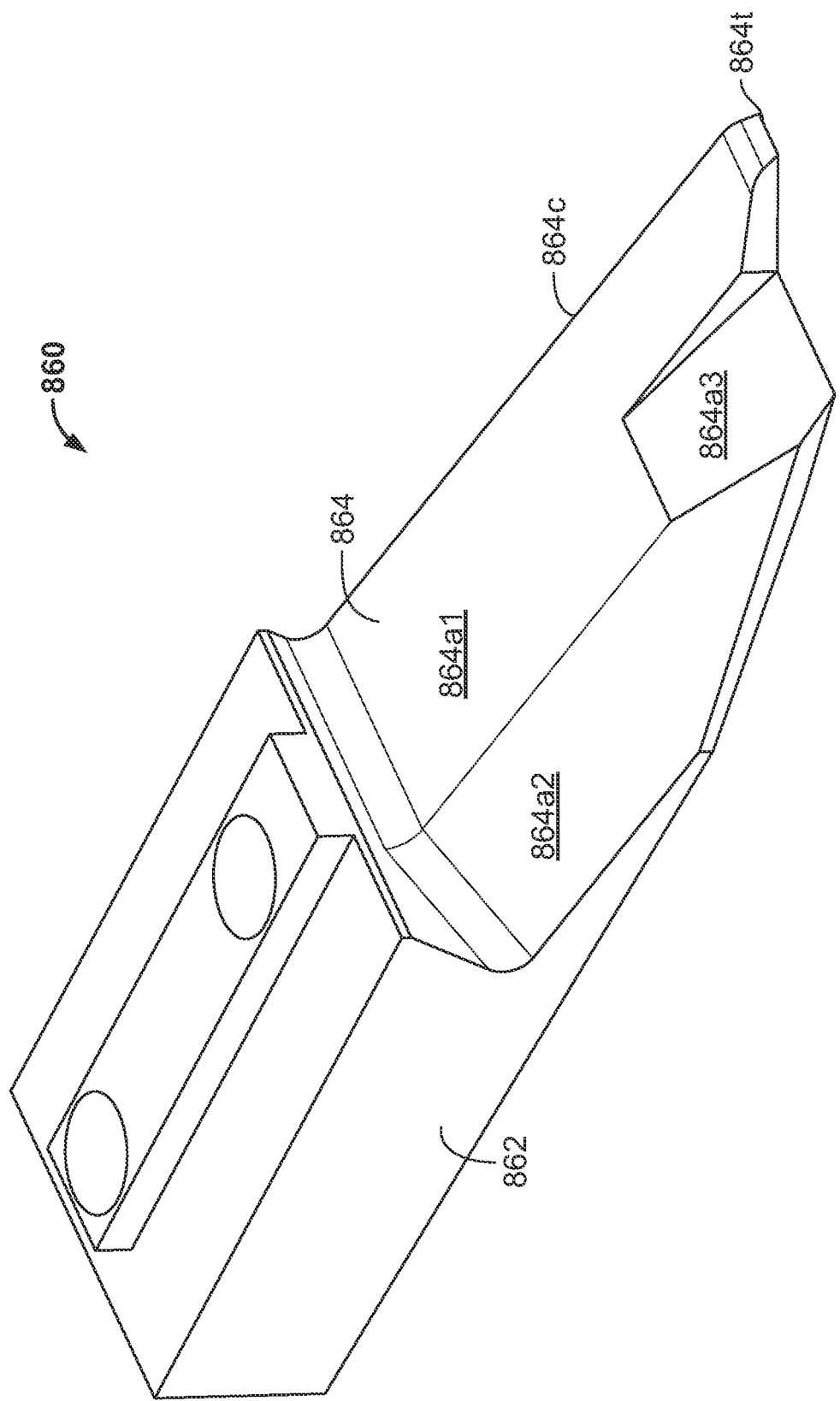

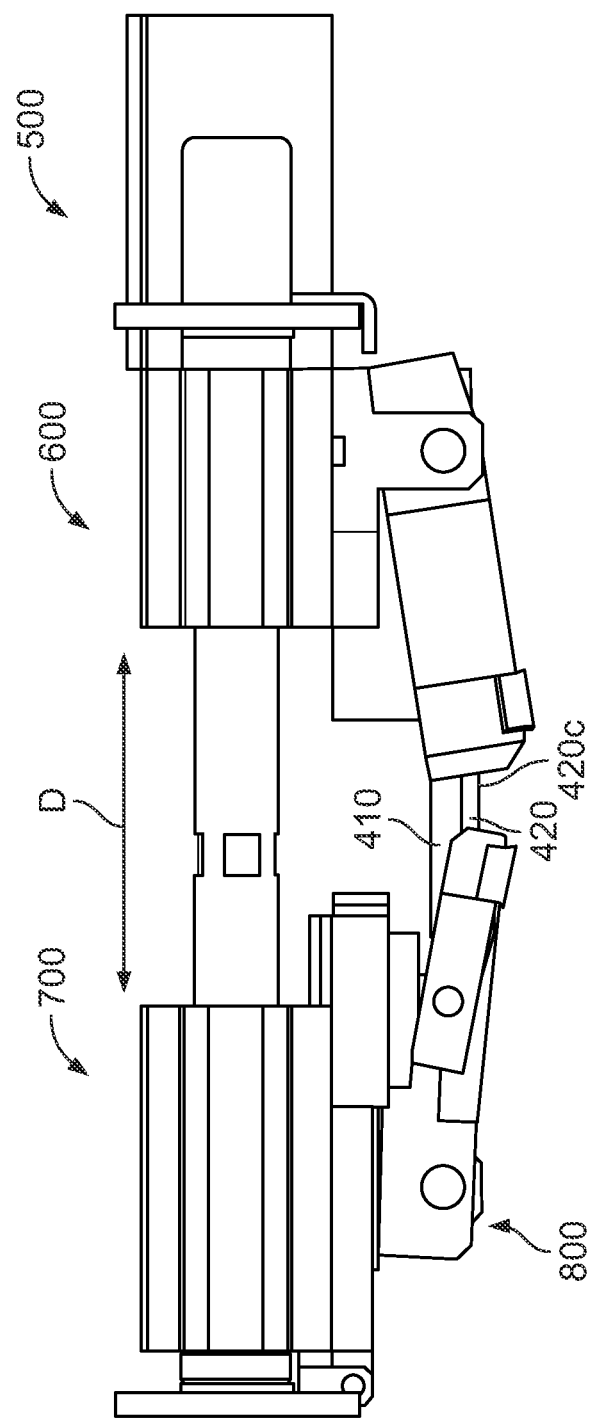

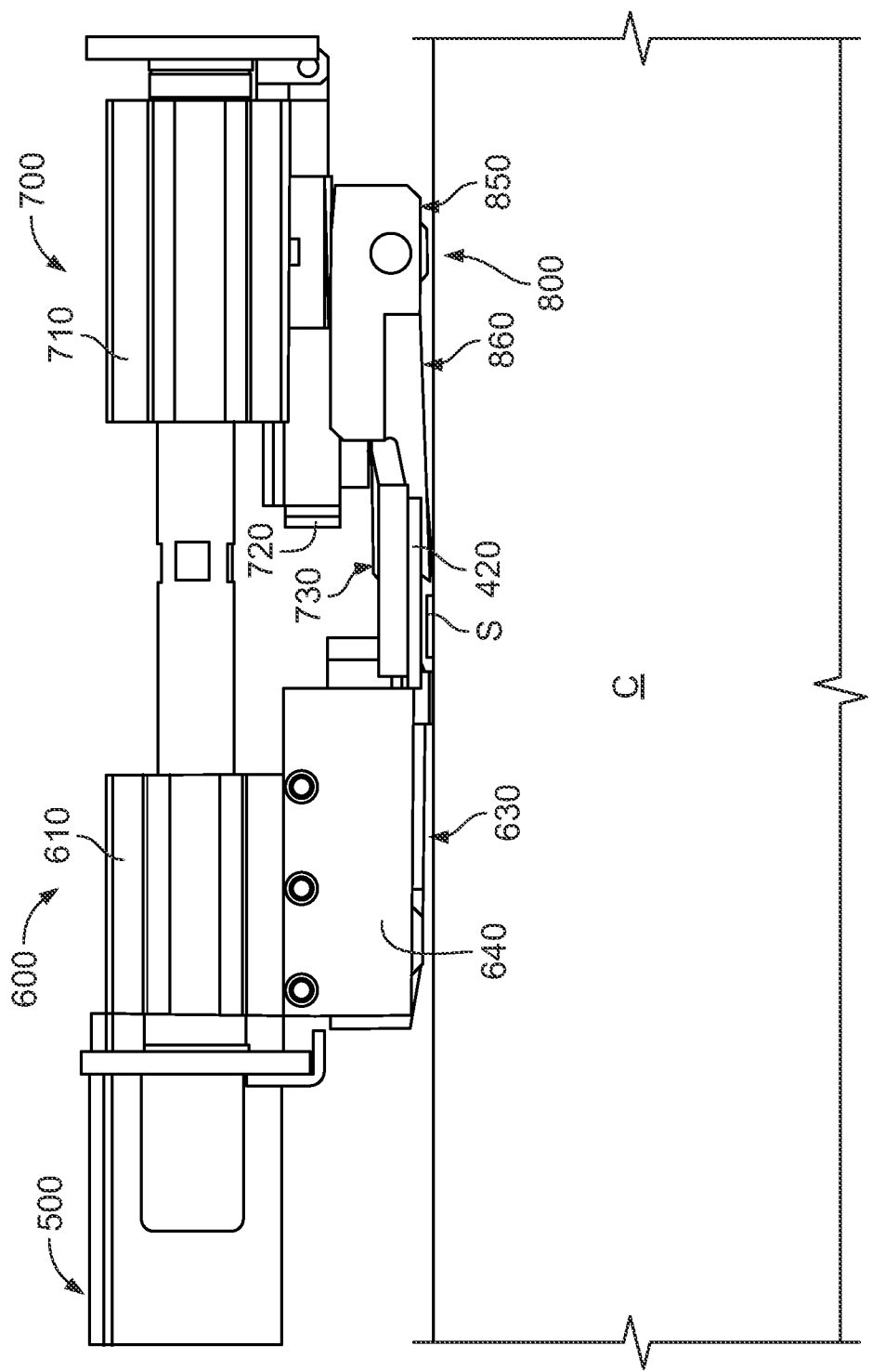

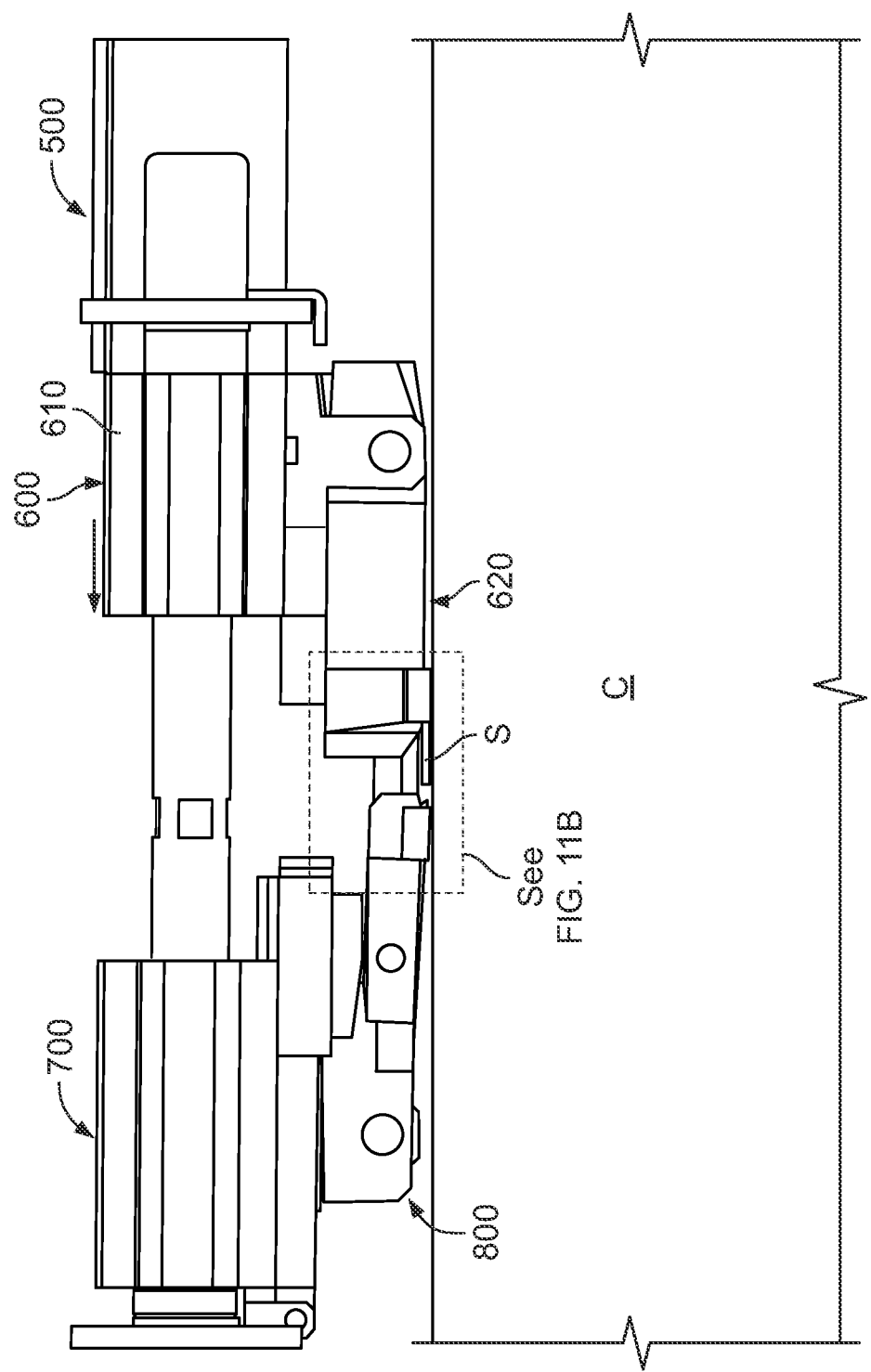

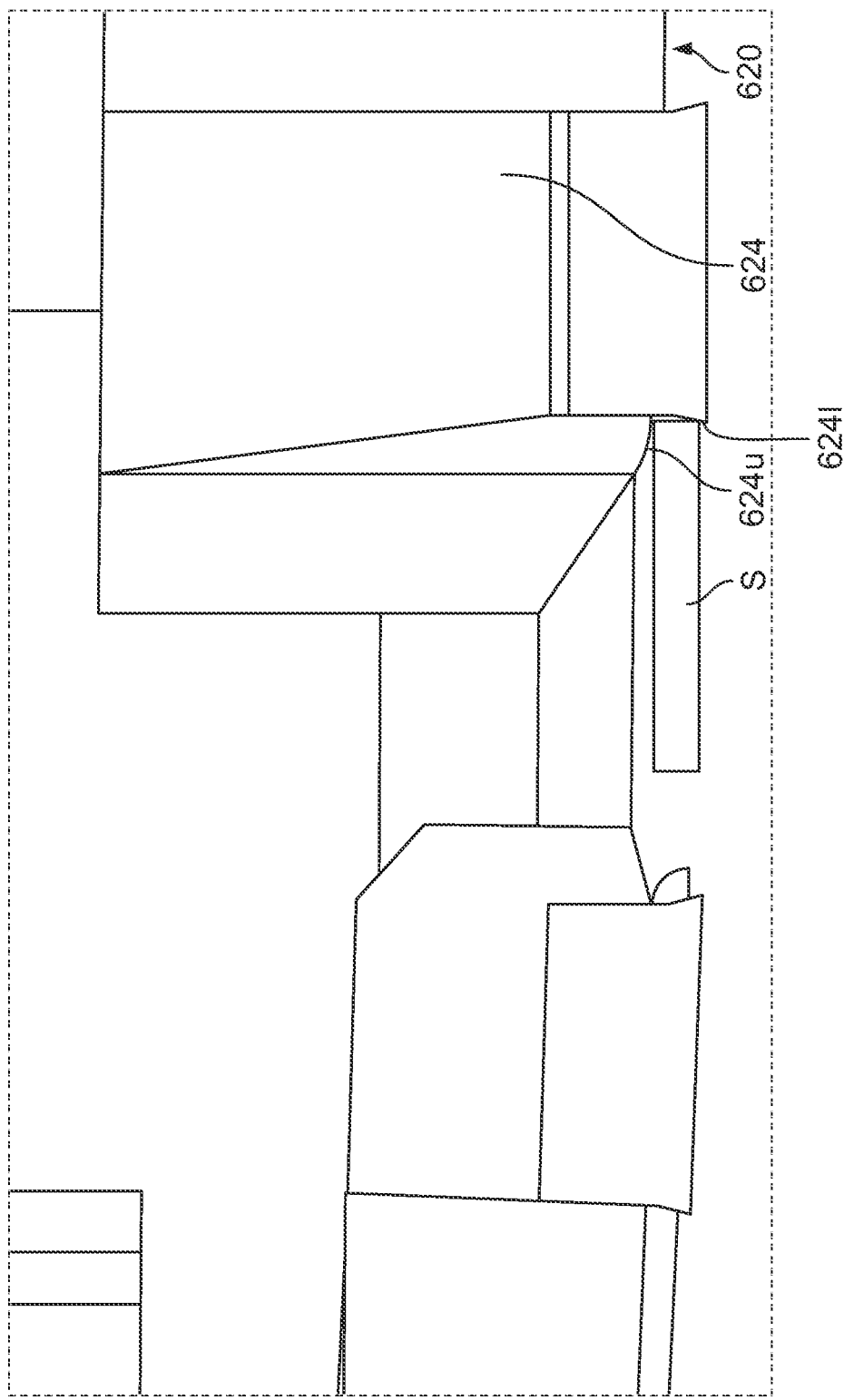

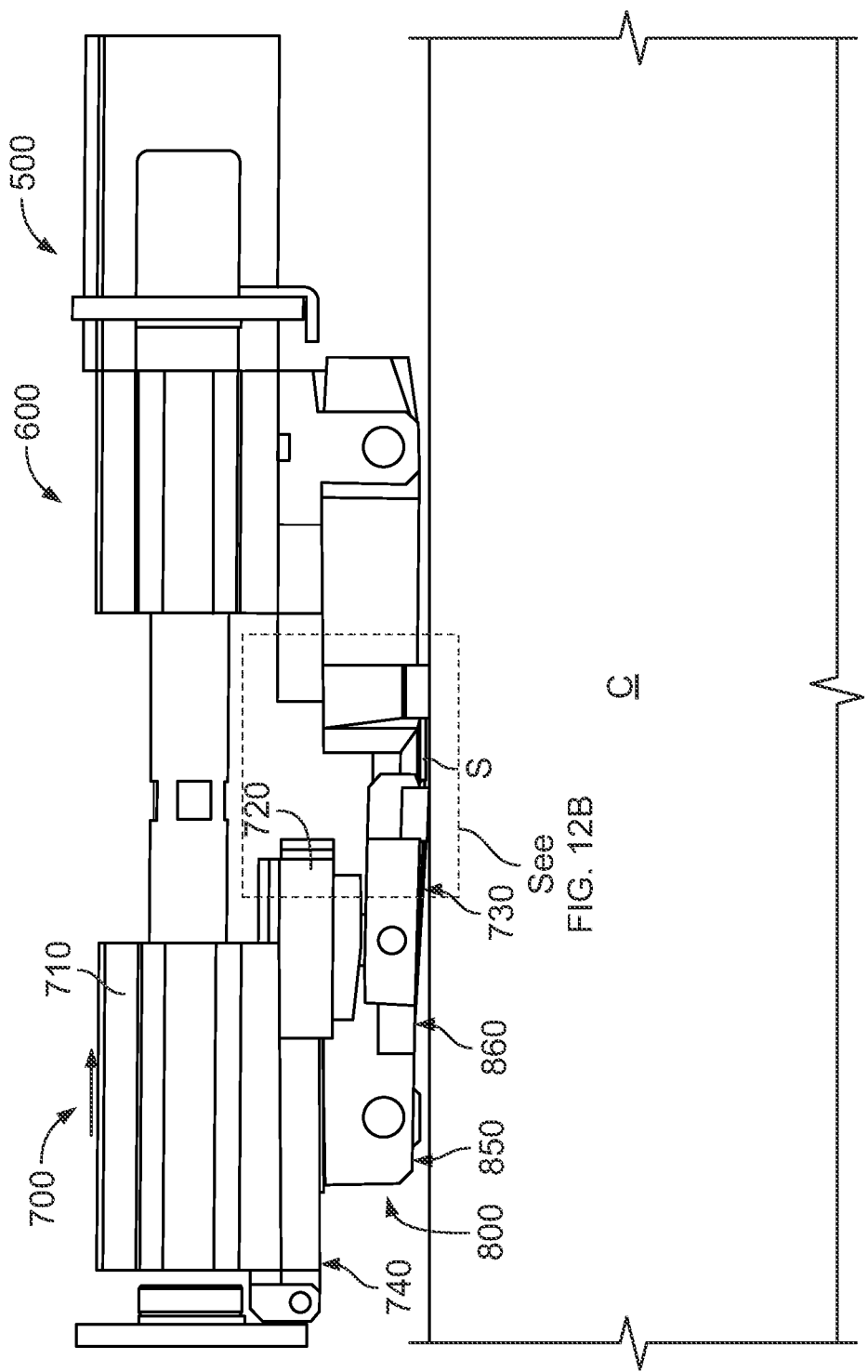

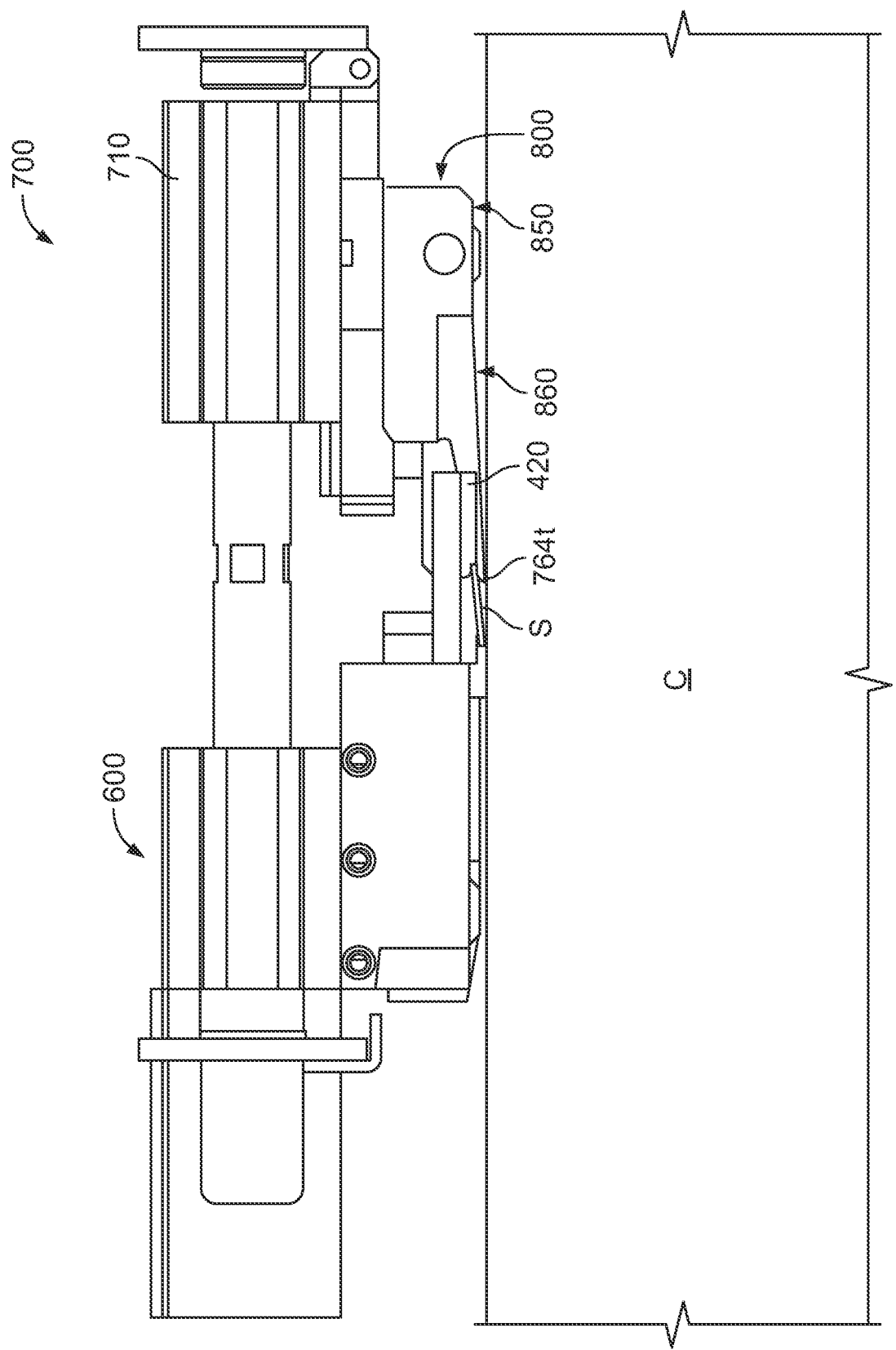

STRAP-SEGMENT-CUTTING SYSTEM

PRIORITY CLAIM

This patent application is a national stage application of PCT Application No. PCT/US2020/065067, filed on 15 Dec. 2020, which claims priority to and the benefit of Korean Patent Application No. 10-2019-0179254, which was filed on Dec. 31, 2019, and which issued as Korean Patent No. 10-2109732 on May 12, 2020, the entire contents of which are incorporated herein by reference.

FIELD

The present disclosure relates to a strap-segment-cutting system for locating and cutting strap segments from an object.

BACKGROUND

Steel, aluminum, and other metals are manufactured into relatively thin sheets that are wound into large, heavy coils for storage and (later) transport to customers. To prevent one of these metal coils from uncoiling, its manufacturer typically applies several highly tensioned segments of steel strap around the outer circumferential surface of the coil and, occasionally, through the "eye" of the coil. Before a customer can use coil, it must remove and dispose of the strap segments. Strap-segment-cutting systems automatically locate the strap segments on the coil, cut them, and deliver them to a winder that winds the strap segments into relatively small coils that are disposed of or recycled.

SUMMARY

Various embodiments of the present disclosure provide a strap-segment-cutting system for locating and cutting strap segments from an object, such as a metal coil.

One embodiment of the strap-segment-cutting system of the present disclosure comprises a strap-segment-cutting head comprising a frame; a first cutter supported by the frame; a first carriage movable relative to the frame between a first-carriage home position and a first-carriage actuated position; a first clamp pivotably mounted to the first carriage and comprising a body having a clamping head and an opposing foot; a first-clamp biasing element biasing the first clamp to a first-clamp home position in which the clamping head of the first clamp is spaced-apart from the first carriage; a second carriage movable relative to the frame and the first cutter between a second-carriage home position and a second-carriage actuated position; a second cutter mounted to the second carriage and comprising a body having a lifting-and-cutting head; and one or more carriage actuators operably connected to the first and second carriages and configured to move the first and second carriages relative to one another from their respective first-carriage and second-carriage home positions in which a first distance separates the first and second carriages to their respective first-carriage and second-carriage actuated positions in which a smaller second distance separates the first and second carriages.

One embodiment of a method of removing a strap segment from an object comprises positioning a strap-segment-cutting head so it is spaced apart from the object and adjacent to the strap segment, wherein the strap-segment-cutting head includes a first cutter; moving the strap-segment-cutting head toward the object to a strap-segment-cutting position such that a clamping head of a first clamp is positioned on a first side of the strap segment and a lifting-and-cutting head of a second cutter is positioned on an opposing second side of the strap segment; moving the first clamp toward the strap segment such that the first clamp clamps the strap segment; and moving the second cutter toward the strap segment such that the second cutter lifts the strap segment into contact with the first cutter and cooperates with the first cutter to cut the strap segment.

BRIEF DESCRIPTION OF THE FIGURES

FIGS. 8A and 8B are perspective views of the second cutter of the second cutting assembly of FIGS. 7A-7C.

FIGS. 9A, 10A, 11A, 12A, 13A, and 14A are side views of the carriage actuator, the first and second clamping assemblies, and the first and second cutting assemblies of FIGS. 5A and 5B during various stages of the strap-segment-cutting process.

FIGS. 11B, 12B, 13B, and 14B are enlarged portions of FIGS. 11A, 12A, 13A, and 14A with the coil removed for clarity.

FIGS. 9B, 10B, 11C, 12C, 13C, and 14C are side views opposite those of FIGS. 9A, 10A, 11A, 12A, 13A, and 14A.

DETAILED DESCRIPTION

Figure 1:
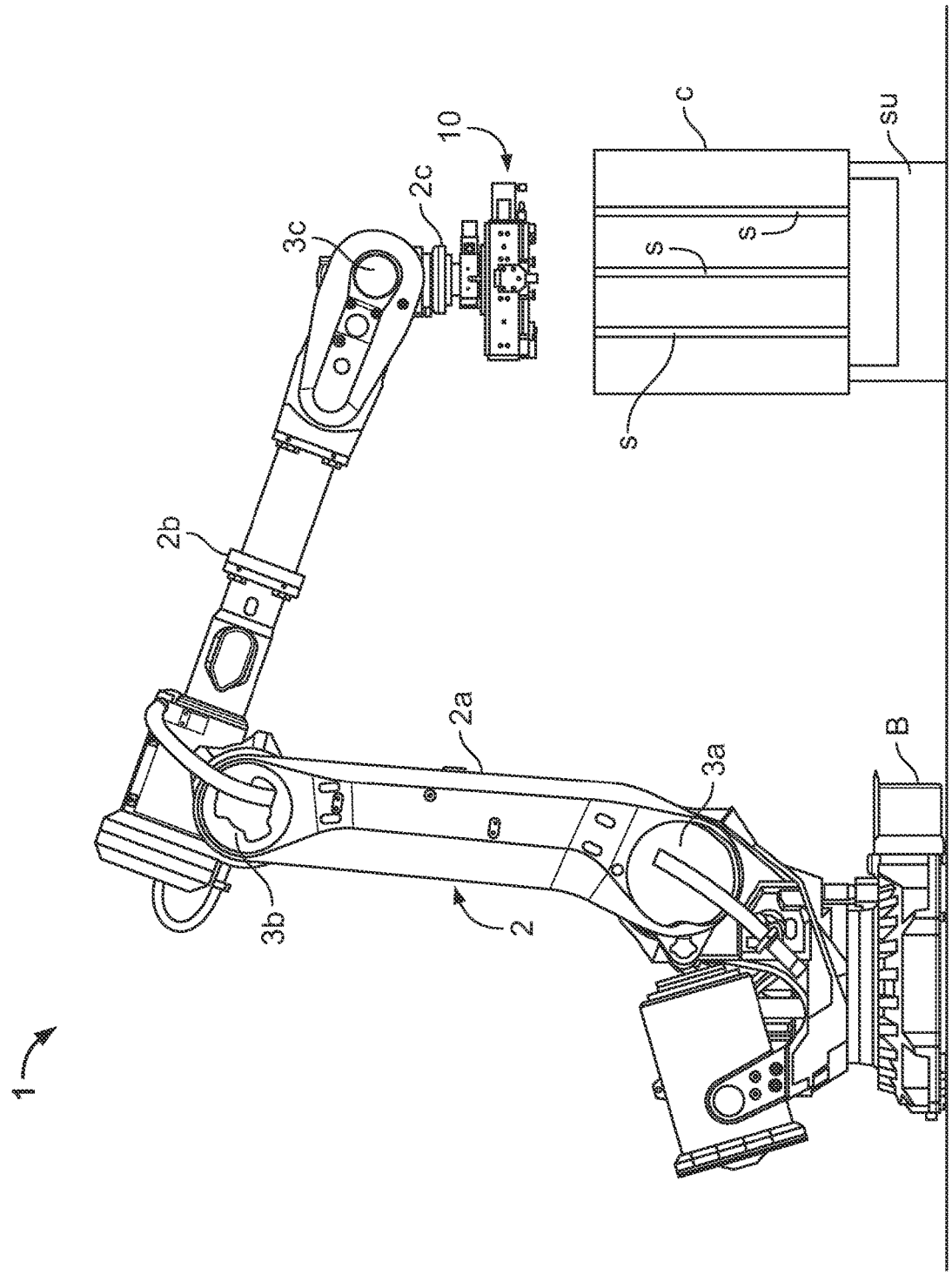
FIG. 1 is a side view of one example embodiment of the strap-segment-cutting system of the present disclosure.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

Figure 2:
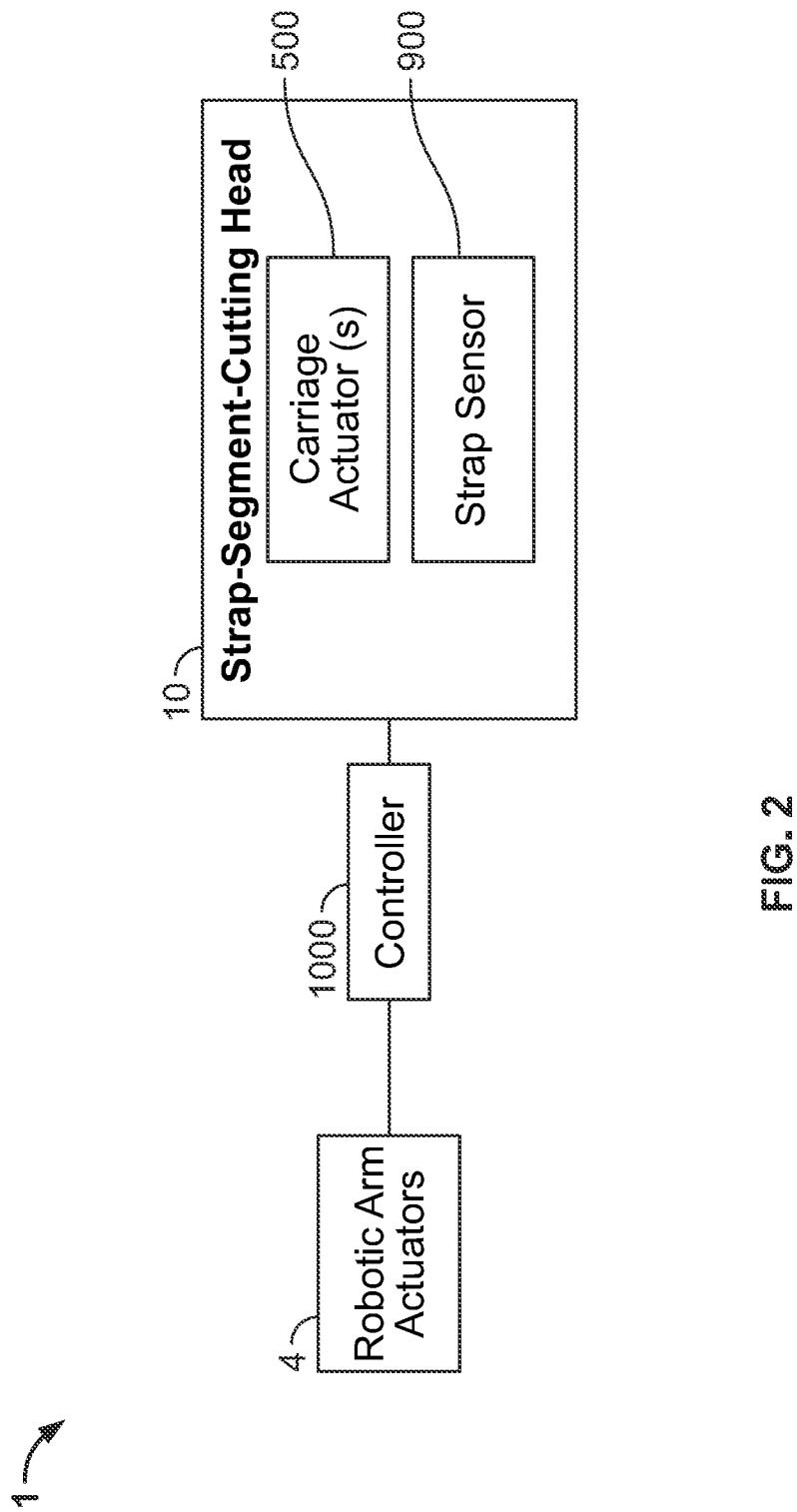
FIG. 2 is a block diagram showing certain components of the strap-segment-cutting system of FIG. 1.

FIGS. 1 and 2 show one example embodiment of a strap-segment-cutting system 1 of the present disclosure and components thereof. The strap-segment-cutting system 1 is configured to locate strap segments S on an object, which in this example embodiment is a metal coil C supported by a support SU (though the object may be any other suitable object in other embodiments); cut the strap segments S from the coil C; and deliver the cut strap segments S to a winder (not shown) or other device for further processing and disposal. The strap-segment-cutting system 1 includes an articulatable robotic arm 2, multiple robotic arm actuators 4, a strap-segment-cutting head 10, a strap sensor 900, and a controller 1000.

The robotic arm 2 is manipulatable to position the strap-segment-cutting head 10 so it can locate and cut the strap segments S from the coil C. The robotic arm 2 includes a base B securable to a floor or other substrate, a first arm segment 2a pivotably connected to the base B at a pivot 3a, a second arm segment 2b pivotably connected to the first arm segment 2a at a pivot 3b, and a third arm segment 2c pivotably connected to the second arm segment 2b at a pivot 3c. The robotic arm actuators 4 are operably connected to the arm segments 2a-2c and configured to pivot the arm segments relative to one another about the pivots 3a-3c. Although not shown here, the robotic arm actuators 4 are operably connected to the first arm segment 2a (and in other embodiments to the second arm segment 2b and/or the third arm segment 2c) to pivot the first arm segment 2a about a vertical axis to enable rotation of the strap-segment-cutting head 10 into and out of the page. In certain embodiments one or more of the robotic arm segments are telescoping such that they can increase or decrease their length. In these embodiments the robotic arm actuators are operably connected to the telescoping robotic arm segments and configured to change their length. The robotic arm actuators may be any suitable actuators, such as (but not limited to) electric, hydraulic, and/or pneumatic motors. This is merely one example robotic arm, and any other suitable robotic arm or other component may be employed to move the strap-segment-cutting head 10.

Figure 3A:
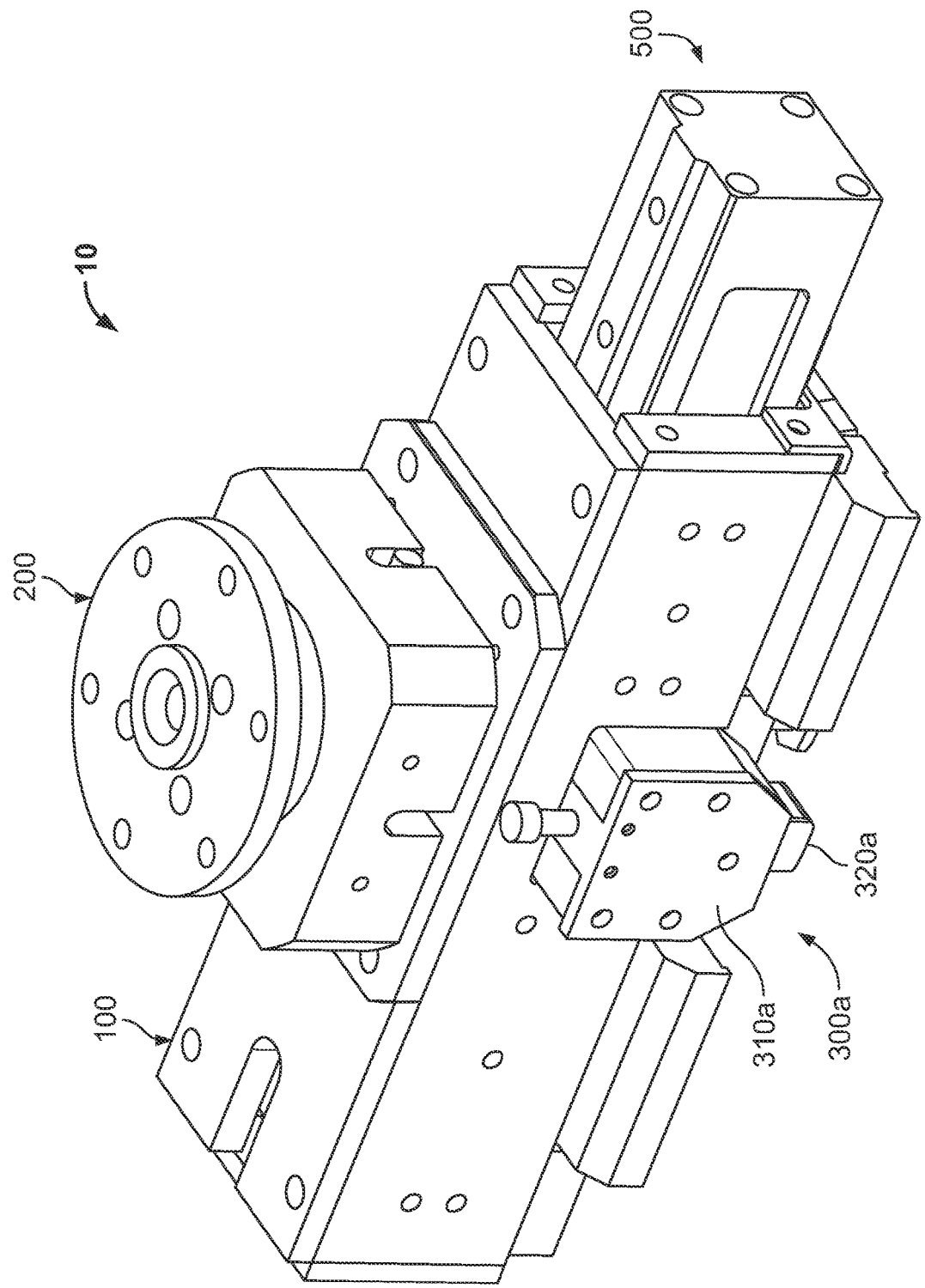
FIGS. 3A and 3B are perspective views of one example embodiment of the strap-segment-cutting head of the strap-segment-cutting system of FIG. 1.

The strap-segment-cutting head 10, which is best shown in FIGS. 3A-14C, is mounted to the free end of the third arm segment 2c and configured cut the strap segments S from the coil C. The strap-segment-cutting head 10 includes a housing 100 (best shown in FIGS. 3A-4), a robotic-arm mount 200 (best shown in FIGS. 3A and 3B), first and second strap securers 300a and 300b (best shown in FIGS. 3A and 3B), a first cutting assembly 400 (best shown in FIG. 4), a carriage actuator 500 (best shown in FIGS. 5A and 5B), a first clamping assembly 600 (sometimes called a "first assembly" and best shown in FIGS. 6A and 6B), a second clamping assembly 700 (sometimes called a "second assembly" and best shown in FIGS. 7A-7C), and a second cutting assembly 800 (best shown in FIGS. 7A-8B).

The frame 100 supports the assemblies and components of the strap-segment-cutting head 10. The frame 100 is formed from any suitable combination of solid members, tubular members, plates, and/or any other suitable components attached to one another. The robotic-arm mount 200 is attached to the frame 100 and is removably attachable to the third arm segment 2c of the robotic arm 2 to removably mount the strap-segment-cutting head 10 to the robotic arm 2.

The first and second strap securers 300a and 300b clamp the strap segment S against the coil C during the strap-segment-cutting process. The first strap securer 300a includes a first housing 310a, a first outer clamp 320a, and a first biasing element (not shown). The first housing 310a is mounted to the frame 100 and at least partially encloses the first biasing element and the first outer clamp 320a. The first biasing element (which is a spring in this example embodiment but may be any other suitable biasing element in other embodiments), biases the first outer clamp 320a to a clamping position (shown in FIGS. 3A and 3B). Similarly, the second strap securer 300b includes a second housing 310b, a second outer clamp 320b, and a second biasing element (not shown). The second housing 310b is mounted to the frame 100 and at least partially encloses the second biasing element and the second outer clamp 320b. The second biasing element (which is a spring in this example embodiment but may be any other suitable biasing element in other embodiments), biases the second outer clamp 320b to a clamping position (shown in FIG. 3B). In other embodiments, the strap-segment-cutting head includes only one strap securer, while in further embodiments the strap-segment-cutting head does not include any strap securers.

Figure 3B:
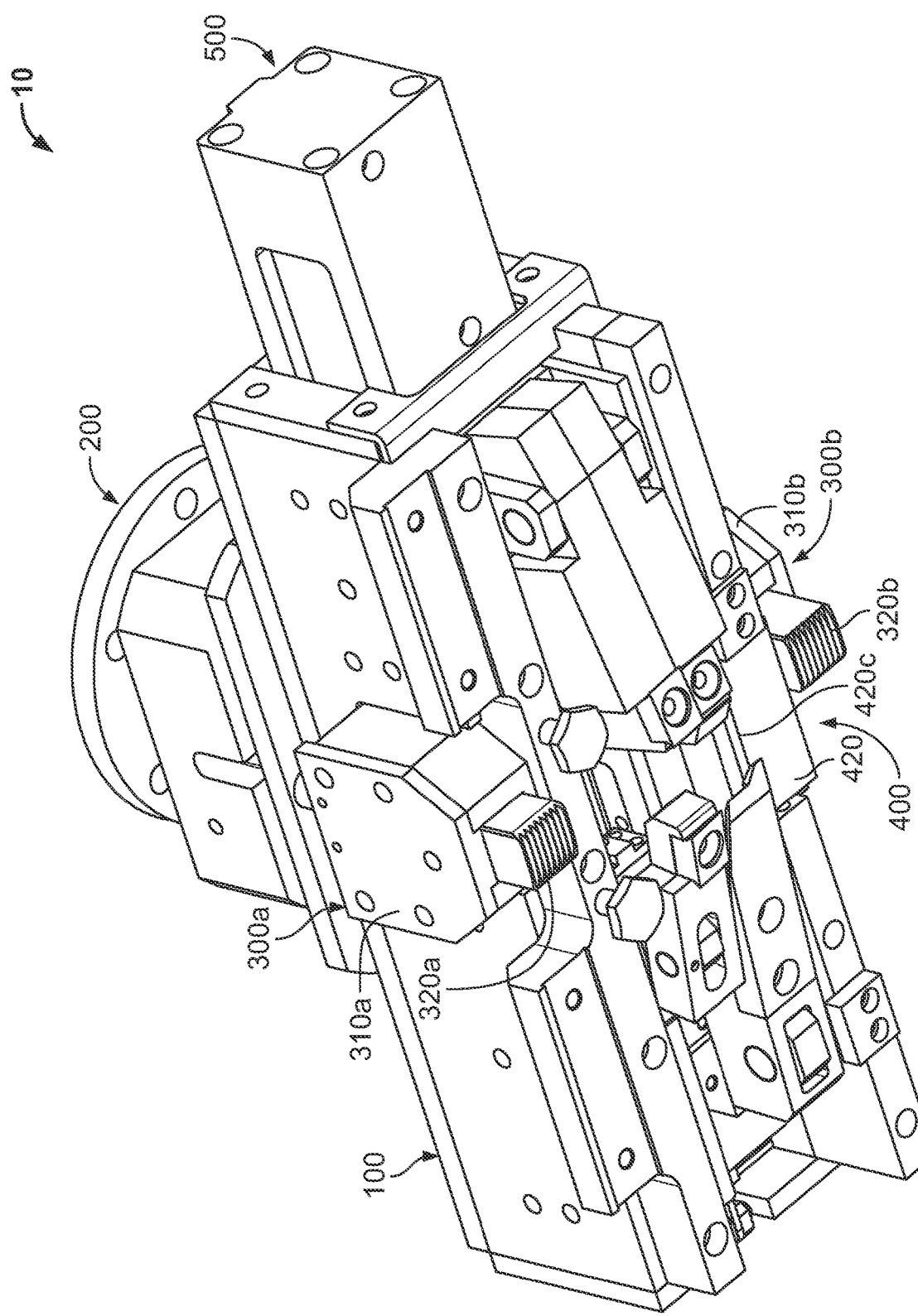
Figure 4:
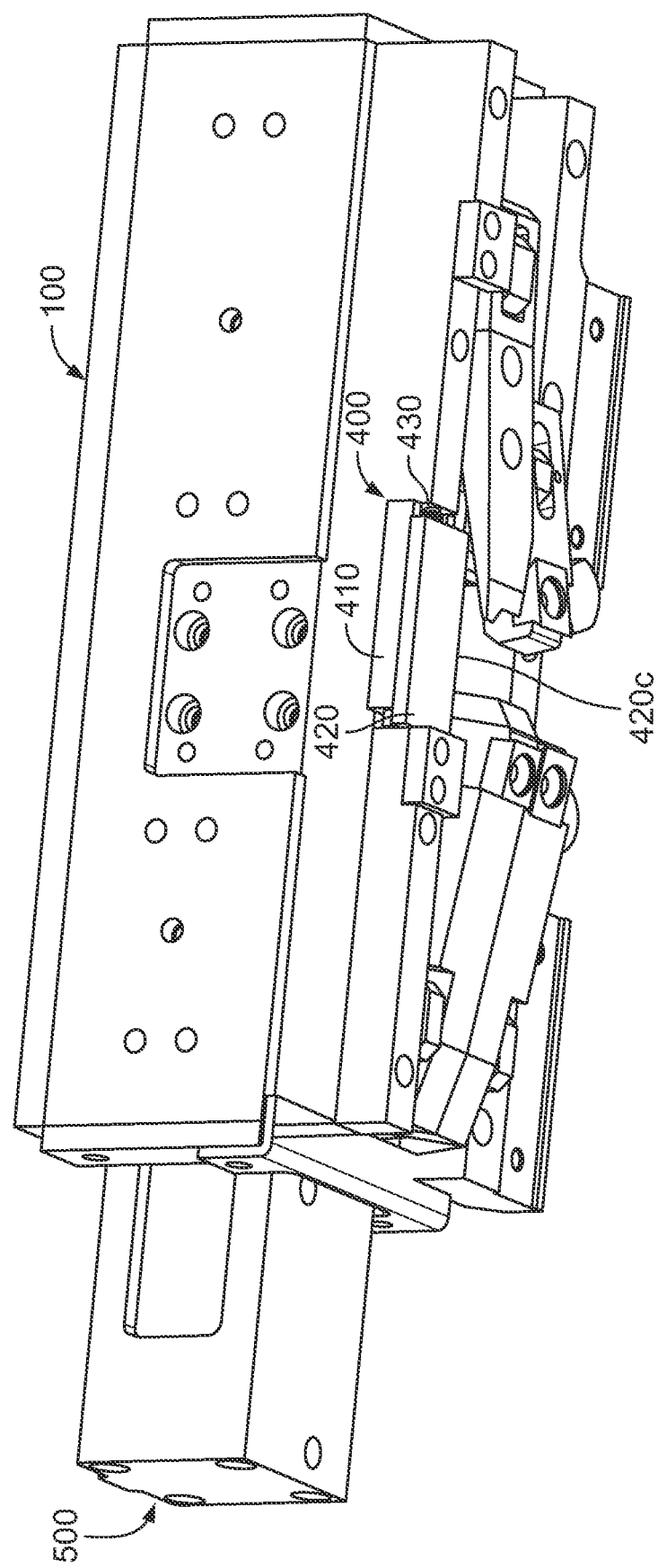
FIG. 4 is a perspective view of the strap-segment-cutting head of FIGS. 3A and 3B with certain components removed to show the first cutting assembly.
Figure 11C:
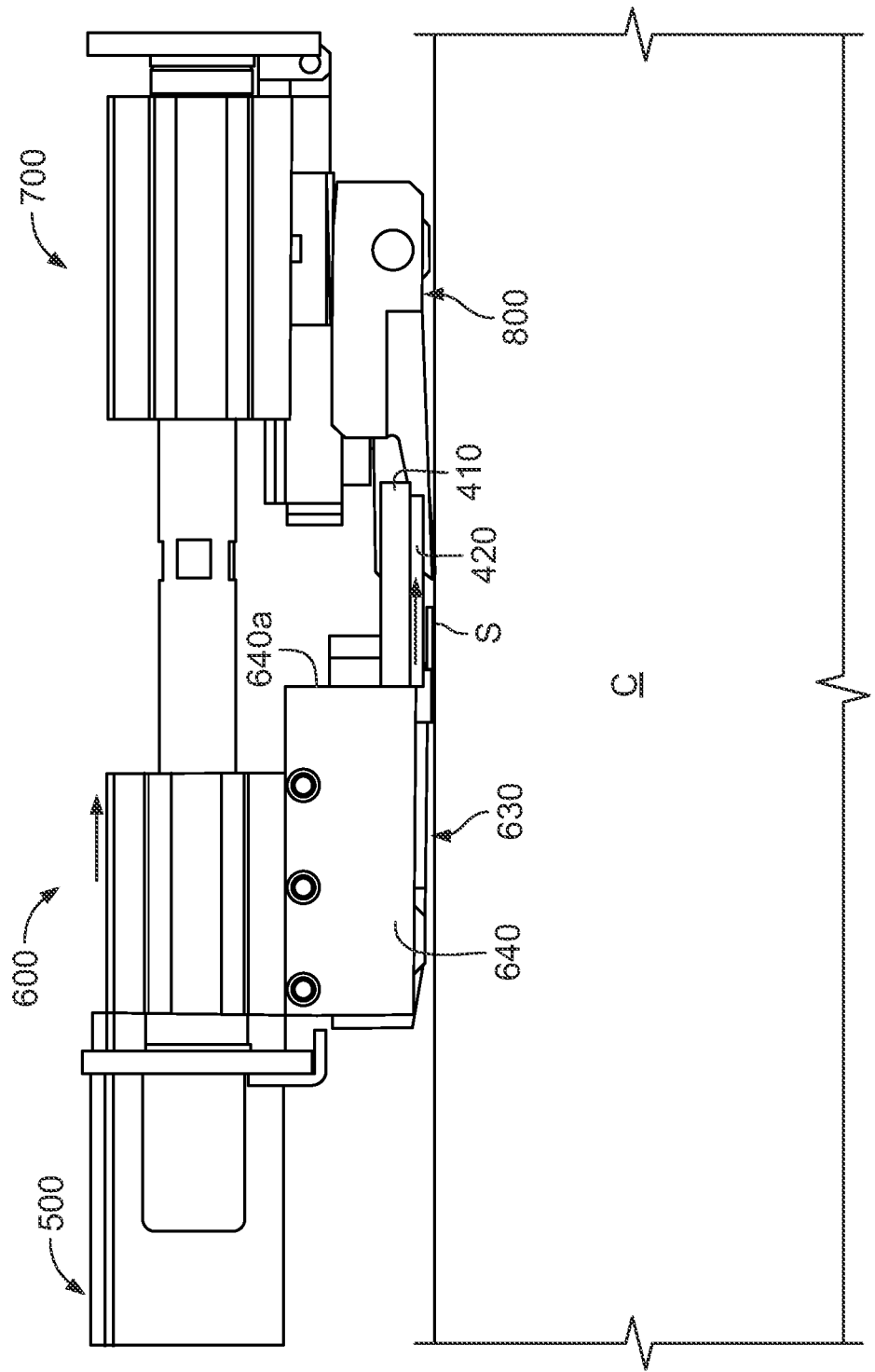

The first cutting assembly 400, which is best shown in FIGS. 3B and 4, cooperates with the second cutting assembly 800 to cut the strap segment S via shearing action as certain components of the second cutting assembly 800 move relative to the first cutting assembly 400, as described in detail below. The first cutting assembly 400 includes a first-cutter mount 410, a first cutter 420, and a first-cutter-biasing element 430. The first-cutter mount 410 is fixedly mounted to the frame 100 via fasteners or in any other suitable manner. The first cutter 420 is slidably mounted to the first-cutter mount 410 and movable relative to the remaining assemblies and components of the strap-segment-cutting head 10 between a home position (FIG. 4) and a cutting position (FIG. 11C). The first-cutter-biasing element 430, which is a spring in this example embodiment (but may be any other suitable biasing element in other embodiments), extends between the frame 100 and the first cutter 420 and biases the first cutter 420 to its home position. The first cutter 420 includes a first cutting edge 420c.

Figure 6A:
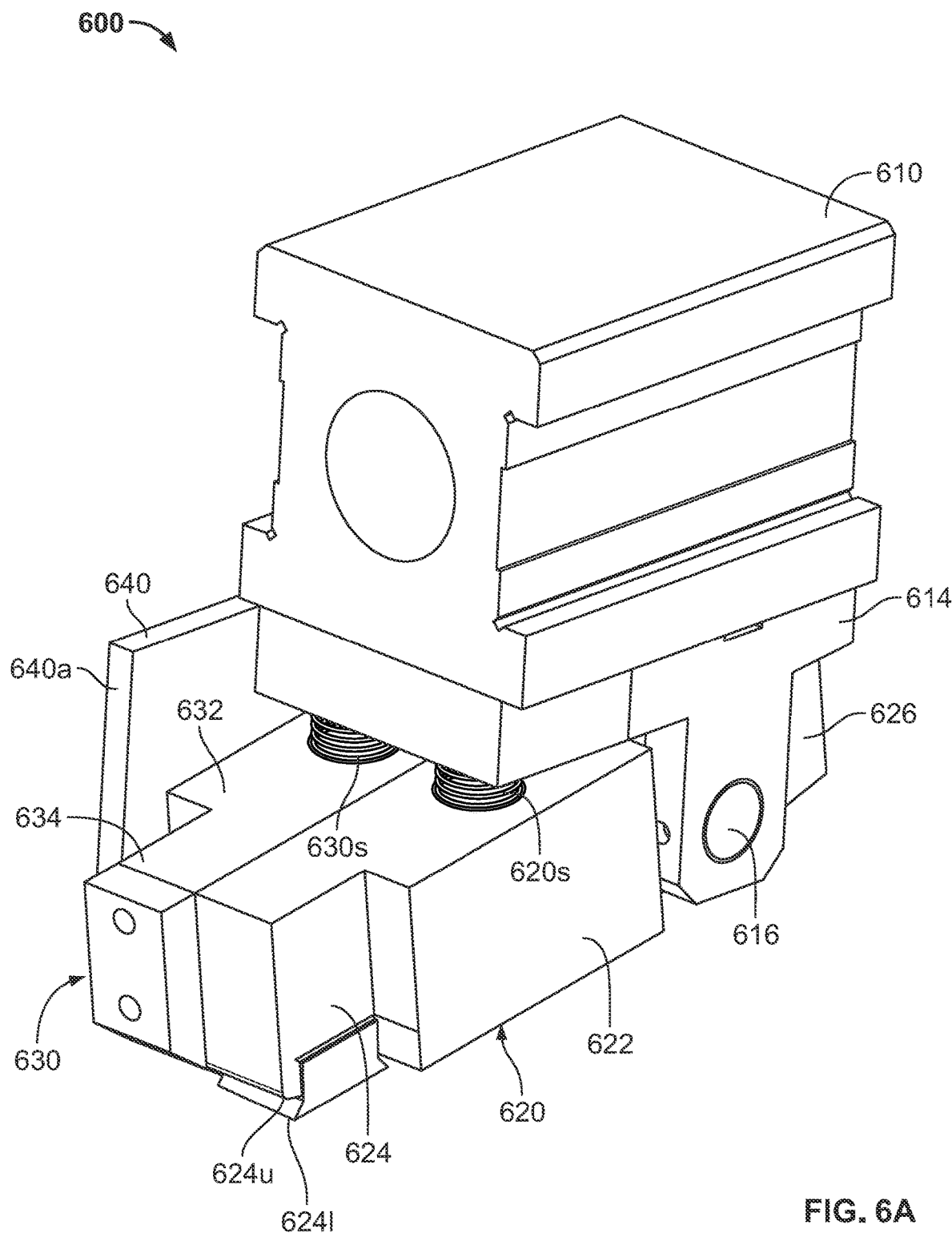
FIGS. 6A and 6B are perspective views of the first clamping assembly of FIGS. 5A and 5B.
Figure 6B:
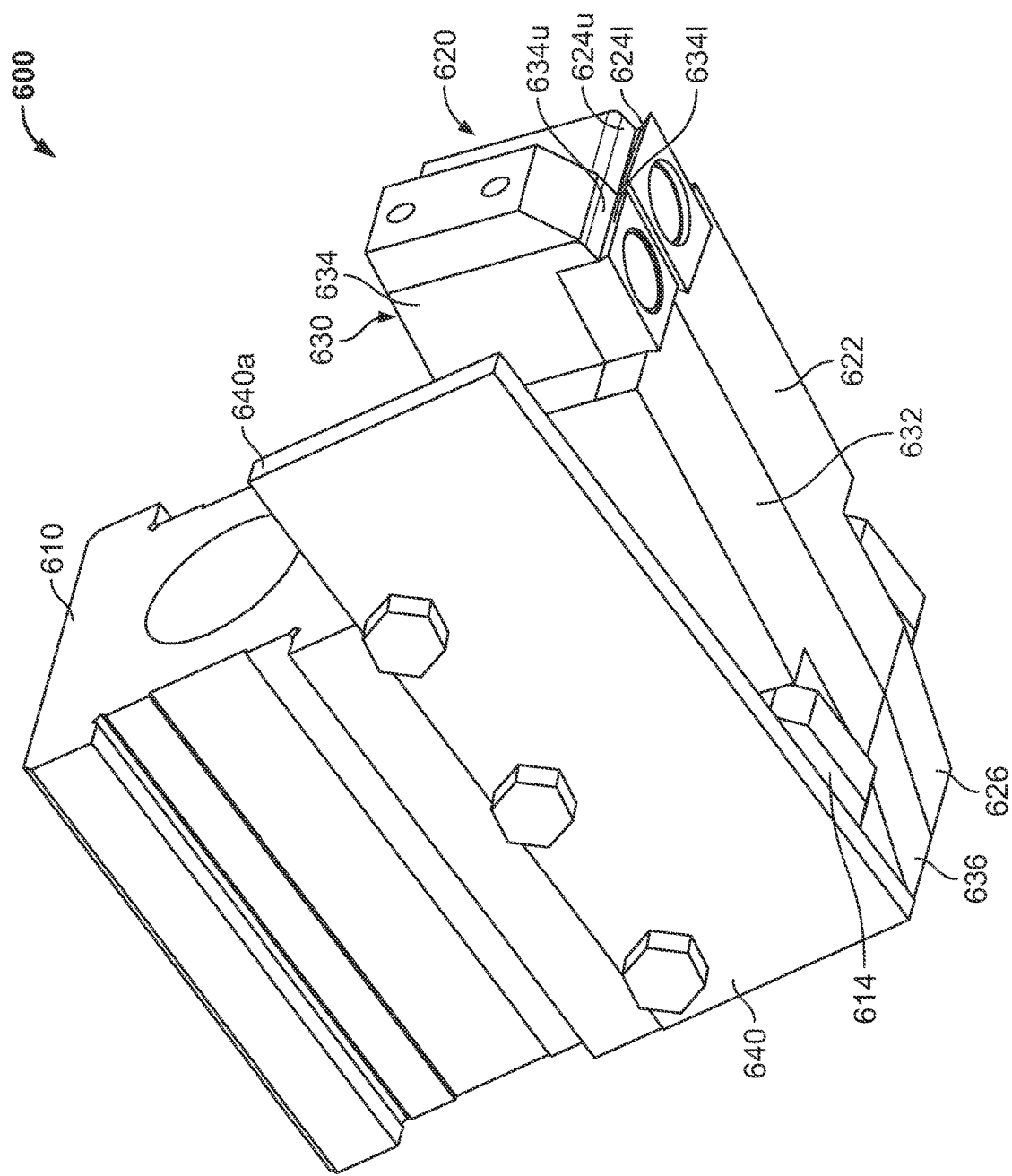

The first clamping assembly 600, which is best shown in FIGS. 6A and 6B, moves the first cutter 420 to its cutting position and cooperates with the second clamping assembly 700 to clamp the strap segment S during the strap-segment-cutting process. The first clamping assembly 600 includes a first carriage 610, a mount 614, a pivot pin 616, a first clamp 620, a first-clamp-biasing element 620s, a second clamp 630, a second-clamp-biasing element 630s, and a first-cutter engager 640.

The first clamp 620 includes a body 622 having a clamping head 624 and an opposing foot 626. The clamping head 624 includes an upper lip 624u and an opposing lower lip 624l that together define a mouth sized to receive the strap segment S (as described below). Similarly, the second clamp 630 includes a body 632 having a clamping head 634 and an opposing foot 636. The clamping head 634 includes an upper lip 634u and an opposing lower lip 634l that together define a mouth sized to receive the strap segment S (as described below).

The mount 614 is attached to the underside of the first carriage 610. The first and second clamps 620 and 630 are mounted to the mount 614 via the pivot pin 616, which extends through bores (not labeled) defined in the mount 614 and the feet 626 and 636 of the first and second clamps 620 and 630. The first clamp 620 is pivotable about the pivot pin 616 and relative to the first carriage 610. The first-clamp-biasing element 620s extends between the mount 614 and the first clamp 620 and biases the first clamp 620 to a home position in which the clamping head 624 is spaced-apart from the mount 614. The second clamp 630 is pivotable about the pivot pin 616 and relative to the first carriage 610. The second-clamp-biasing element 630s extends between the mount 614 and the second clamp 630 and biases the second clamp 630 to a home position in which the clamping head 634 is spaced-apart from the mount 614. In this example embodiment the first and second clamps 620 and 630 are independently pivotable, while in other embodiments the first and second clamps are configured such that they pivot as one.

The first-cutter engager 640, which is a plate in this example embodiment (but may be any other suitable component in other embodiments), is fixedly attached to the first carriage 610 such that a leading surface 640a of the first-cutter engager 640 faces the first cutter 420.

Figure 7A:
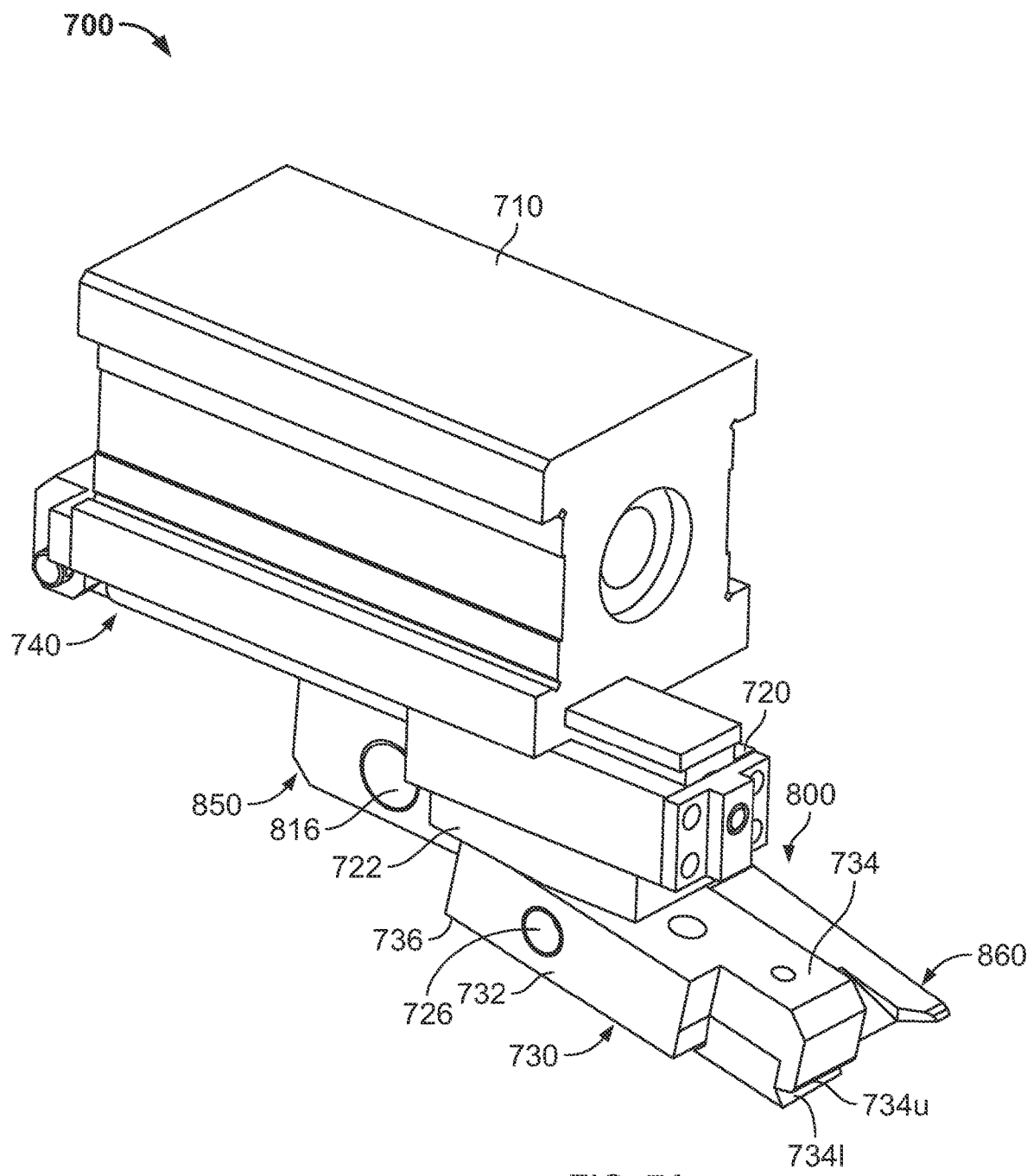
FIGS. 7A-7C are perspective views of the second clamping assembly and the second cutting assembly of FIGS. 5A and 5B.
Figure 7B:
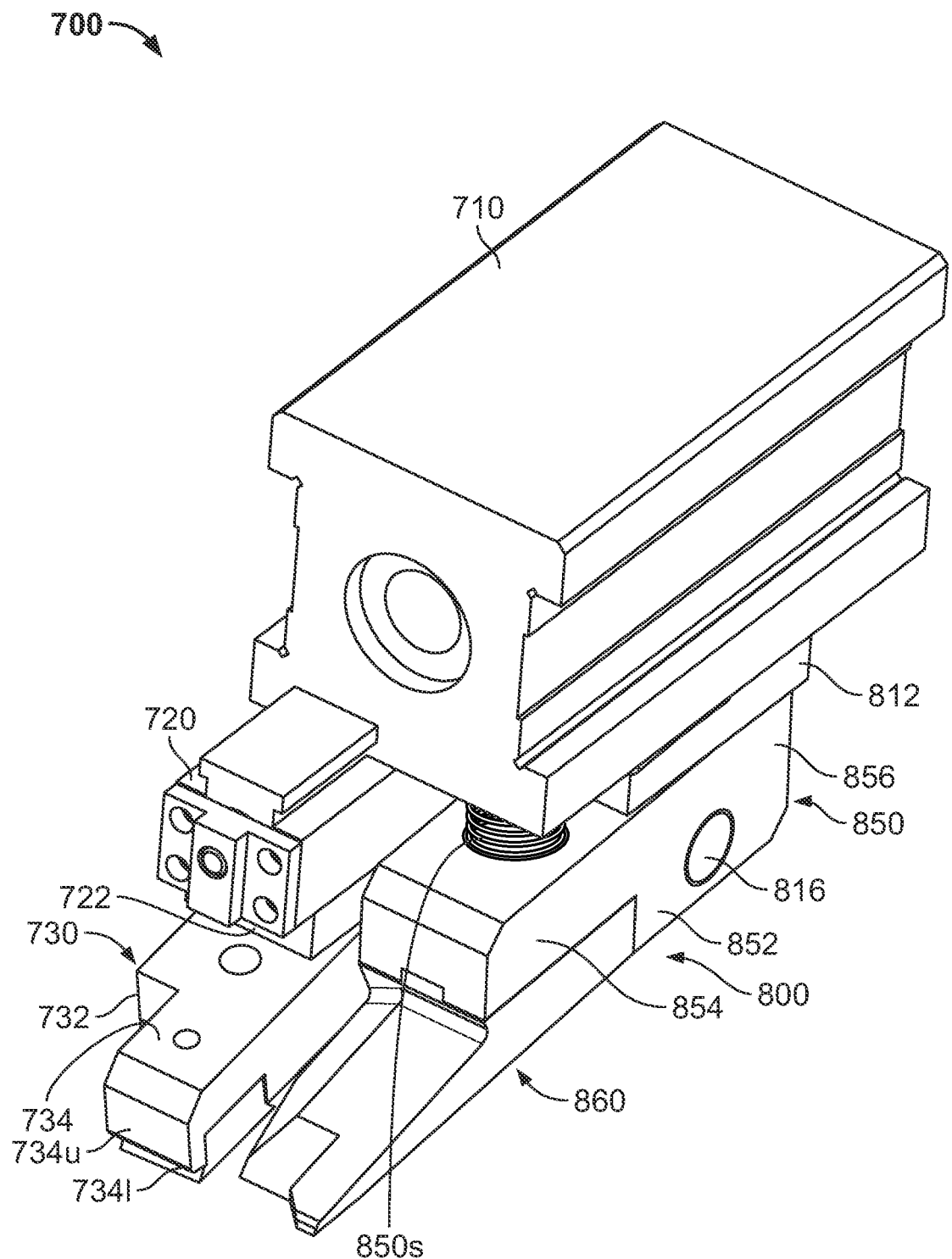
Figure 7C:
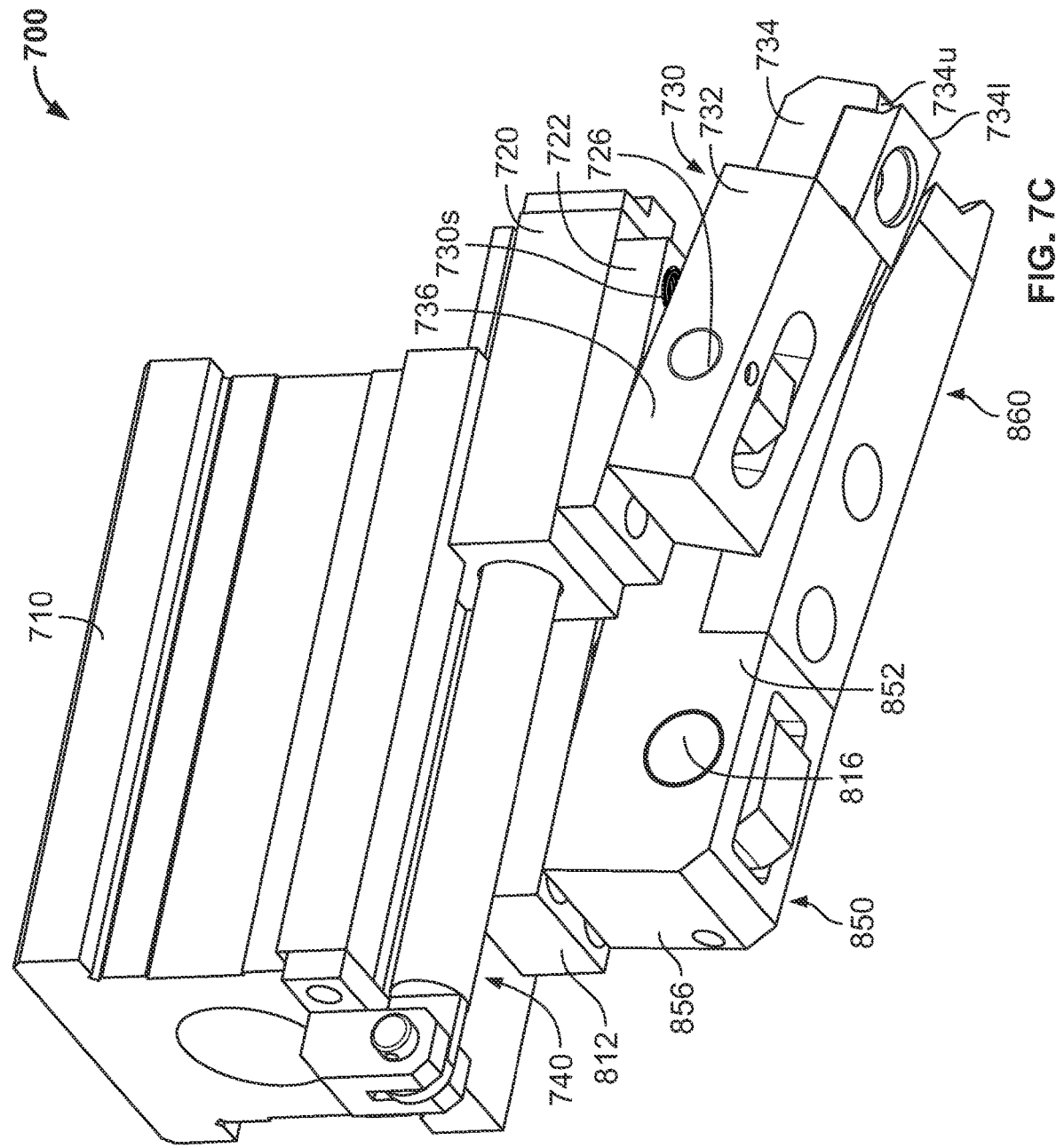
Figure 8B:
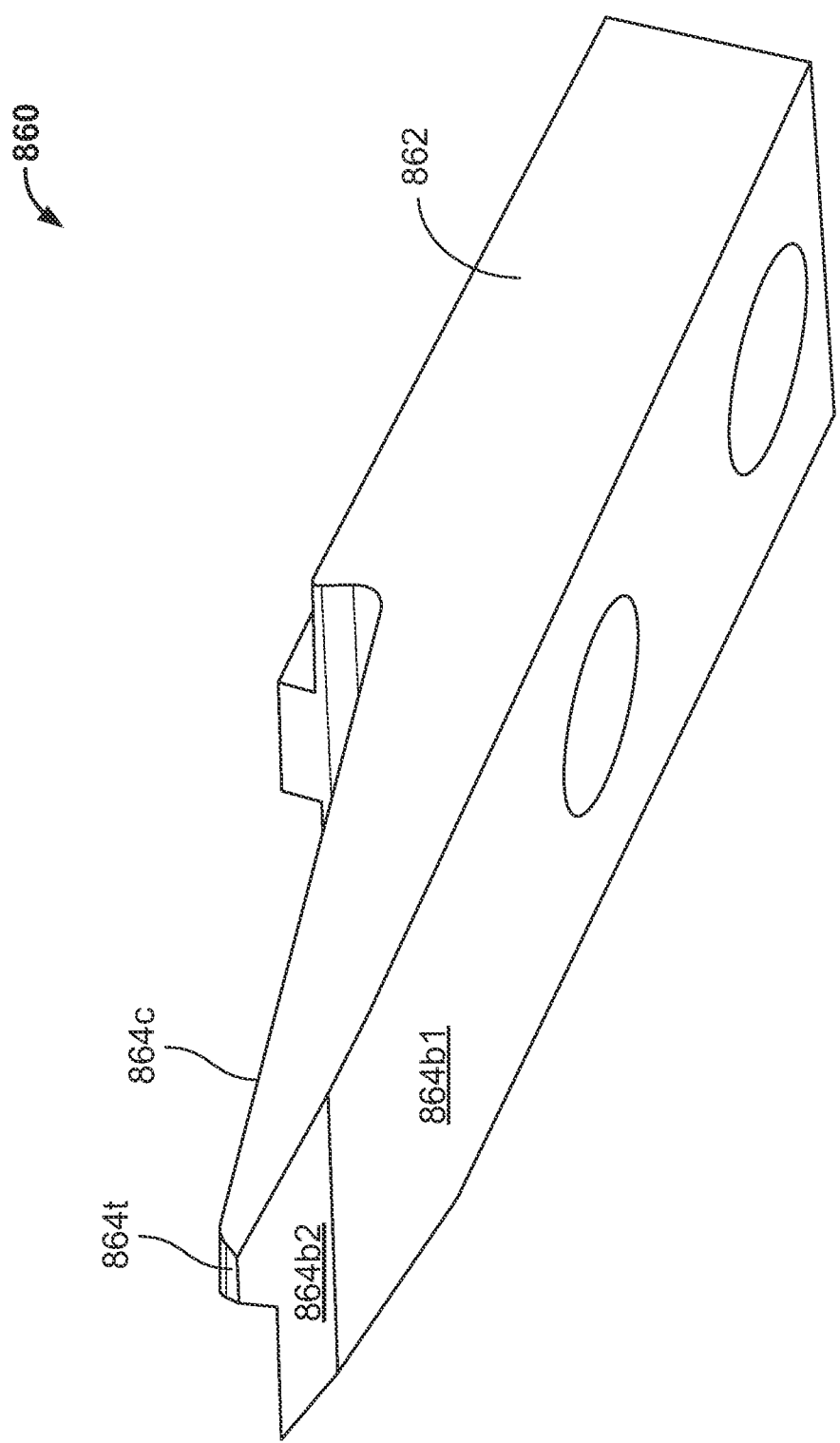

The second clamping assembly 700, which is best shown in FIGS. 7A-7C, cooperates with the first clamping assembly 600 to clamp the strap segment S during the strap-segment-cutting process. The second clamping assembly 700 includes a second carriage 710, a third-clamp carriage 720, a third-clamp mount 722, a third-clamp pivot pin 726, a third clamp 730, a first third-clamp-biasing element 730s, and a second third-clamp-biasing element 740.

The third clamp 730 includes a body 732 having a clamping head 734 and an opposing foot 736. The clamping head 734 includes an upper lip 734u and an opposing lower lip 734l that together define a mouth sized to receive the strap segment S (as described below). The third-clamp mount 722 is attached to the underside of the third-clamp carriage 720. The third clamp 730 is mounted to the third-clamp mount 722 via the third-clamp pivot pin 726, which extends through bores (not labeled) defined in the third-clamp mount 722. The third clamp 730 is pivotable about the third-clamp pivot pin 726 relative to the third-clamp carriage 720. The first third-clamp-biasing element 730s extends between the third-clamp mount 722 and the third clamp 730 biases the third clamp 730 to a home position in which the clamping head 734 is spaced-apart from the third-clamp mount 722.

The third-clamp carriage 720 is slidably mounted to the second carriage 710 and movable relative to the second carriage 710. The second third-clamp-biasing element 740, which is a gas spring in this example embodiment but may be any other suitable biasing element (such as a compression spring) in other embodiments, biases the third-clamp carriage 720 to a home position (FIGS. 7A-7C) relative to the second carriage 710.

The second cutting assembly 800 is mounted to the second clamping assembly 700 (and more particularly to the second carriage 710) and cooperates with the first cutting assembly 400 to cut the strap segment S during the strap-segment-cutting process. The second cutting assembly 800 includes a second-cutting-assembly mount 812, a second-cutting-assembly pivot pin 816, a second-cutter carrier 850, a second cutter 860, and a second-cutter-biasing element 860s.

The second-cutter carrier 850 has a body 852 having a head 854 and an opposing foot 856. The second cutter 860 (best shown in FIGS. 8A and 8B) has a body 862 with a lifting-and-cutting head 864 at one end. The lifting-and-cutting head 864 terminates in a tip 864t at its forward end and includes planar upper surfaces 864a1, 864a2, and 864a3 angled relative to one another and opposing planar lower surfaces 864b1 and 864b2 angled relative to one another. The upper surface 864a1 defines a second cutting edge 864c that, as described below, cooperates with the first cutting edge 420c of the first cutter 420 to cut the strap segment S.

The second-cutter carriage 850 is mounted to the second-cutting-assembly mount 812, which is attached to the underside of the second carriage 710, via the second-cutting-assembly pivot pin 816. The second-cutting-assembly pivot pin 816 extends through bores (not labeled) defined in the second-cutting-assembly mount 812 and the foot 856 of the second-cutter carrier 850. The second cutter 860 is removably attached to the head 854 of the second-cutter carrier 850 such that the tip 864t of the second cutter 860 extends toward the clamping assembly 800. The second-cutter mount 850 (with the second cutter 860 attached thereto) is pivotable about the second-cutting-assembly pivot pin 816 and relative to the second carriage 710. The second-cutter-biasing element 860s extends between the second-cutting-assembly mount 812 and the second-cutter carrier 850 and biases the second-cutter carrier 850 to a home position in which the head 854 and the second cutter 860 are spaced-apart from the second-cutting-assembly mount 812.

Figure 5A:
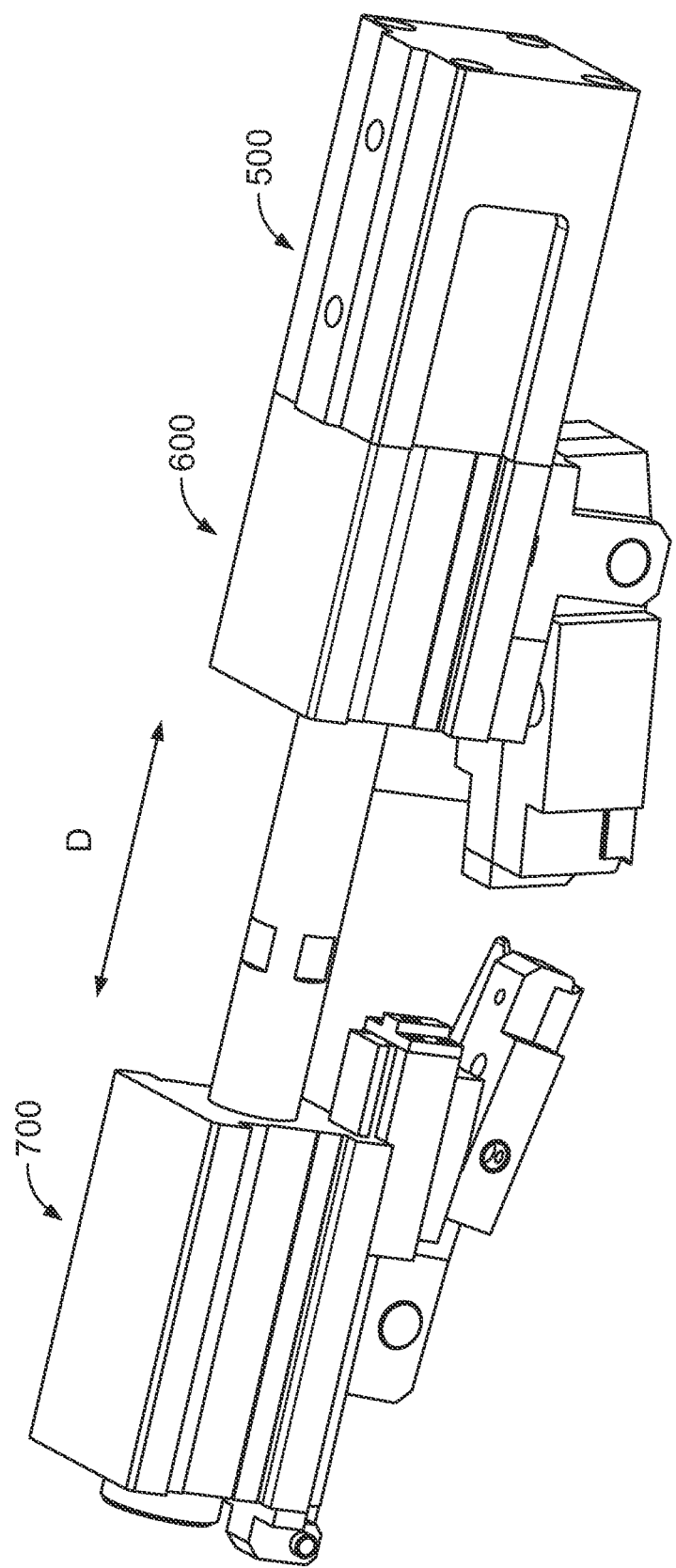
FIGS. 5A and 5B are perspective views of the carriage actuator, the first clamping assembly, the second clamping assembly, and the second cutting assembly of the strap-segment-cutting head of FIGS. 3A and 3B.
Figure 5B:
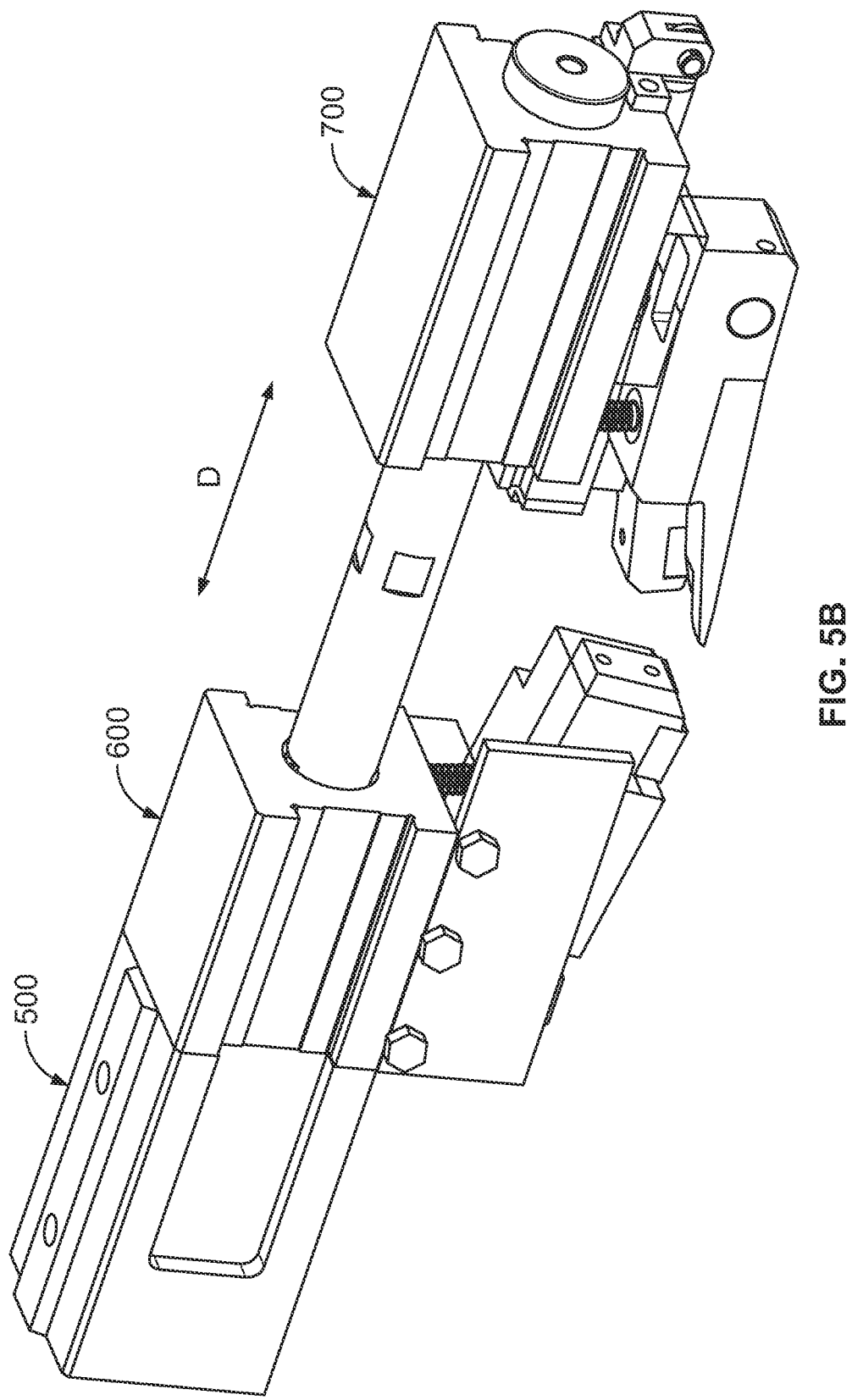

The carriage actuator 500, which is best shown in FIGS. 5A and 5B, is operably connected to the first carriage 610 and the second carriage 710 and configured to move these carriages relative to one another (and to the other assemblies and components of the strap-segment-cutting head 10) between respective home positions (FIG. 9A) and respective actuated positions (FIG. 14A) to cut the strap segment S (as described below). The first and second carriages are a first distance apart when in their respective home positions and a smaller second distance apart (i.e., closer to one another) when in their respective actuated positions. The carriage actuator 500 may include any suitable type of actuator, such as a hydraulic actuator, a pneumatic actuator, or an electric actuator. In this example embodiment, the carriage actuator 500 is slidably mounted to the frame 100 so it can move relative to the frame 100. In this example embodiment, the carriage actuator is fixedly mounted to the first carriage 610.

In other embodiments, the strap-segment-cutting head includes two carriage actuators, one that is operably connected to the first carriage and configured to move the first carriage between its home and actuated positions and another that is operably connected to the second carriage and configured to move the second carriage between its home and actuated positions.

The strap sensor 900 includes any suitable sensor configured to detect the strap segments S on the coil C, such as (but not limited to) a laser displacement sensor. The strap sensor 900 may be part of the strap-segment-cutting head 10 or separate from the strap-segment-cutting head 10 so long as the strap sensor 900 is positioned and oriented to detect the strap segments S.

The controller 1000 includes a processing device (or devices) communicatively connected to a memory device (or devices). For instance, the controller may include a programmable logic controller. The processing device may include any suitable processing device such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device may include any suitable memory device such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processing device to control operation of the strap-segment-cutting system 1 (including the strap-segment-cutting head 10), such as to carry out the strap-segment-cutting process described below with respect to FIGS. 9A-14C. As shown in FIG. 2, the controller 1000 is communicatively and operably connected to the robotic arm actuators 4, the carriage actuator 500, and the strap sensor 900 and configured to receive signals from and to control those components.

Figure 9B:
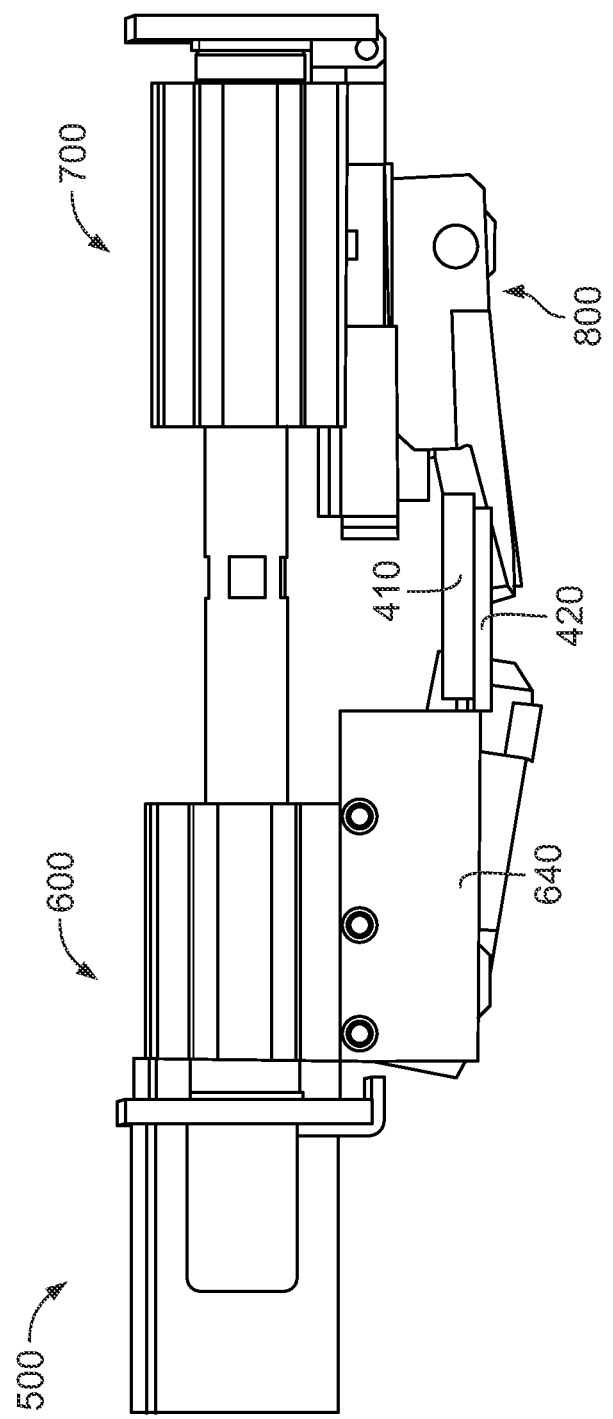

Operation of the strap-segment-cutting system 10 to carry out a strap-segment-cutting process for cutting the strap segment S from the coil C is now described in conjunction with FIGS. 9A-14C. Initially, as shown in FIGS. 9A and 9B, the first cutter 420, the first carriage 610, the first and second clamps 620 and 630, the second carriage 710, the third-clamp carriage 720, the third clamp 730, and the second cutter 860 are in their respective home positions.

The controller 1000 controls the robotic arm actuators 4 to manipulate the robotic arm 2 to move the strap-segment-cutting head 10 adjacent to the coil C. The controller 1000 then controls the robotic arm actuators 4 to manipulate the robotic arm 2 so the strap-segment-cutting head 10 moves side-to-side relative to the coil C while the strap sensor 900 scans for the strap segment S. Once the strap sensor 900 detects the strap segment S, the controller 1000 controls the robotic arm actuators 4 to manipulate the robotic arm 2 to position the strap-segment-cutting head 10 so the strap segment S is between the first clamping assembly 600 and the second clamping assembly 700 and beneath the first and second outer clamps 320a and 320b of the first and second strap securers 300a and 300b.

Figure 10A:
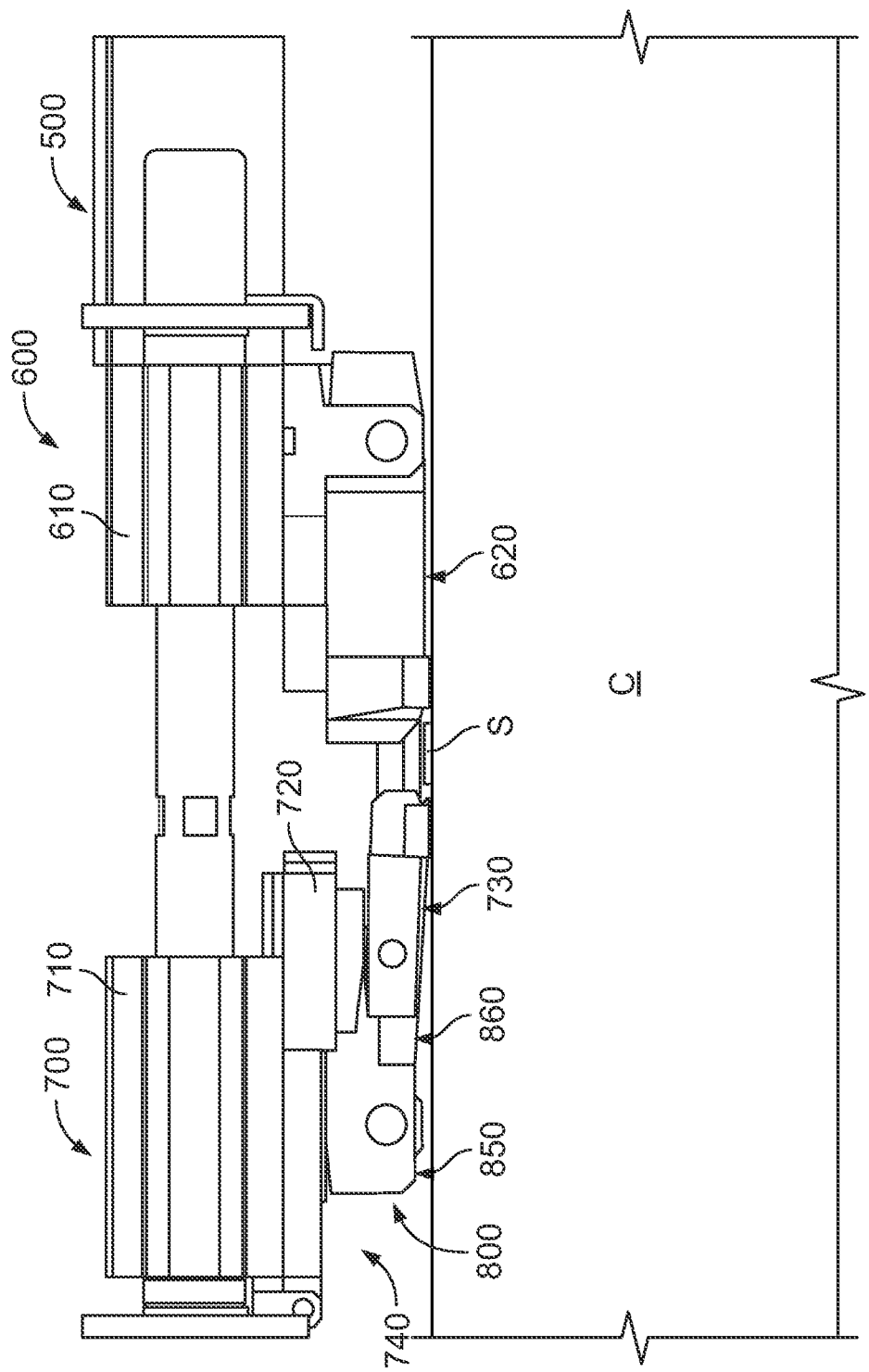

The controller 1000 then controls the robotic arm actuators 4 to manipulate the robotic arm 2 to move the strap-segment-cutting head 10 toward the coil C. As this occurs, the first and second outer clamps 320a and 320b engage and apply clamping forces to portions of the strap segment S to clamp those portions of the strap segment S against the coil C. Additionally, the heads 624, 634, and 734 of the first, second, and third clamps 620, 630, and 730 and the lifting-and-cutting head 864 of the second cutter 860 engage the coil C and begin pivoting away from their respective home positions (against the biasing forces imposed by their respective biasing elements) as the strap-segment-cutting head 10 continues moving toward the coil C. The controller 1000 controls the one or more of the robotic arm actuators 4 to stop moving the strap-segment-cutting head 10 once the it reaches a strap-segment-cutting position (which the controller may determine using a sensor that senses the distance between the strap-segment-cutting head 10 and the coil C (the strap sensor 900 may provide this functionality or a separate sensor may be used) or by monitoring the load on one or more of the robotic arm actuators 4). As shown in FIGS. 10A and 10B, when the strap-segment-cutting head 10 is in its strap-segment-cutting position, the first, second, and third clamps 620, 630, and 730 and the lifting-and-cutting head 864 of the second cutter 860 are generally aligned with the outer surface of the coil C with the heads 624 and 634 of the first and second clamps 620 and 630 facing one side of the strap segment S and the clamping head 734 of the third clamp 730 and the lifting-and-cutting head 864 of the second cutter 860 facing the opposite side of the strap segment S.

The controller 1000 controls the carriage actuator 500 to move the first carriage 610 from its home position toward the strap segment S. The lower lips 6241 and 6341 of the heads 624 and 634 of the first and second clamps 620 and 630 engage and slightly lift the strap segment S into contact with the respective upper lips 624u and 634u such that the side of the strap segment S is received in the respective mouths of the first and second clamps 620 and 630, as best shown in FIGS. 11A and 11B. As this occurs, the leading surface 640a of the first-cutter engager 640 engages the first cutter 420 and moves the first cutter 420 from its home position to its cutting position, as best shown in FIG. 11C. The first carriage 610 reaches its actuated position as the first cutter 420 reaches its cutting position, and since the frame 100 prevents further movement of the first cutter 420, the engagement between the first-cutter engager 640 and the first cutter 420 prevent further movement of the clamping-assembly carriage 610 toward the strap segment S.

Figure 12B:
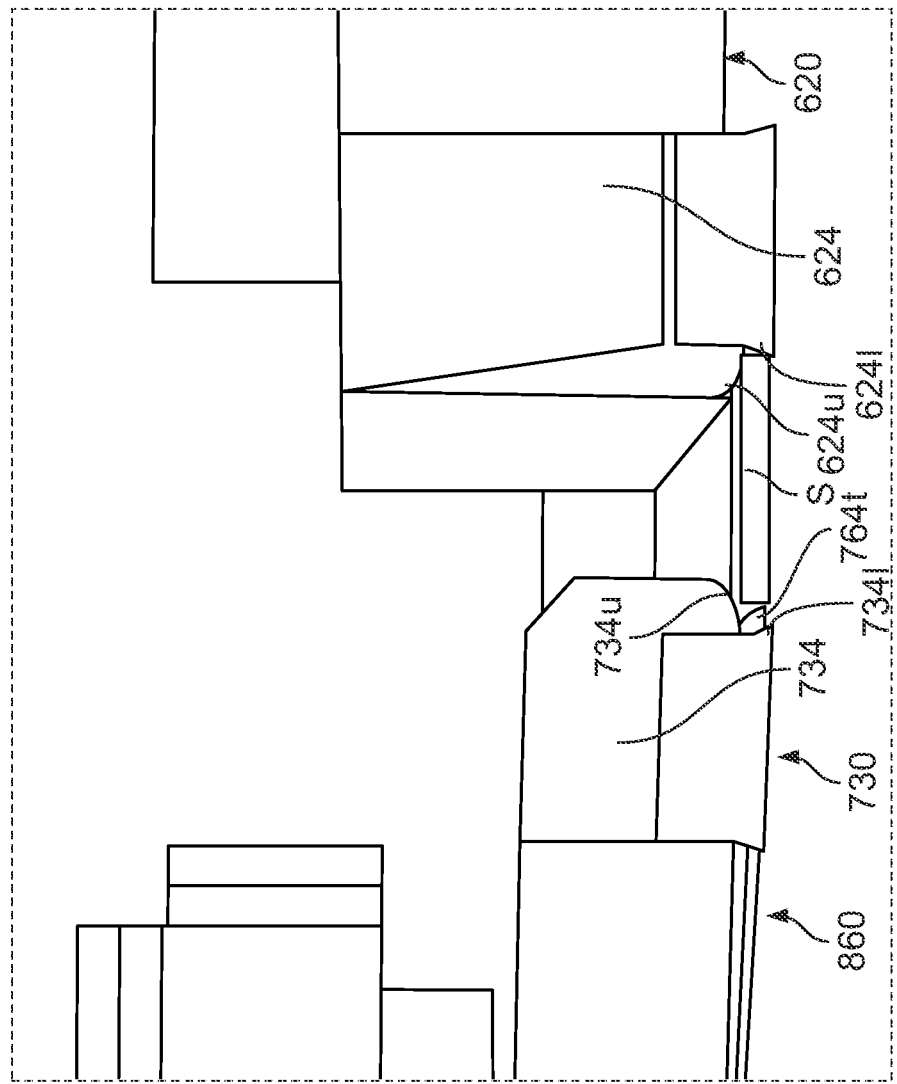
Figure 12C:
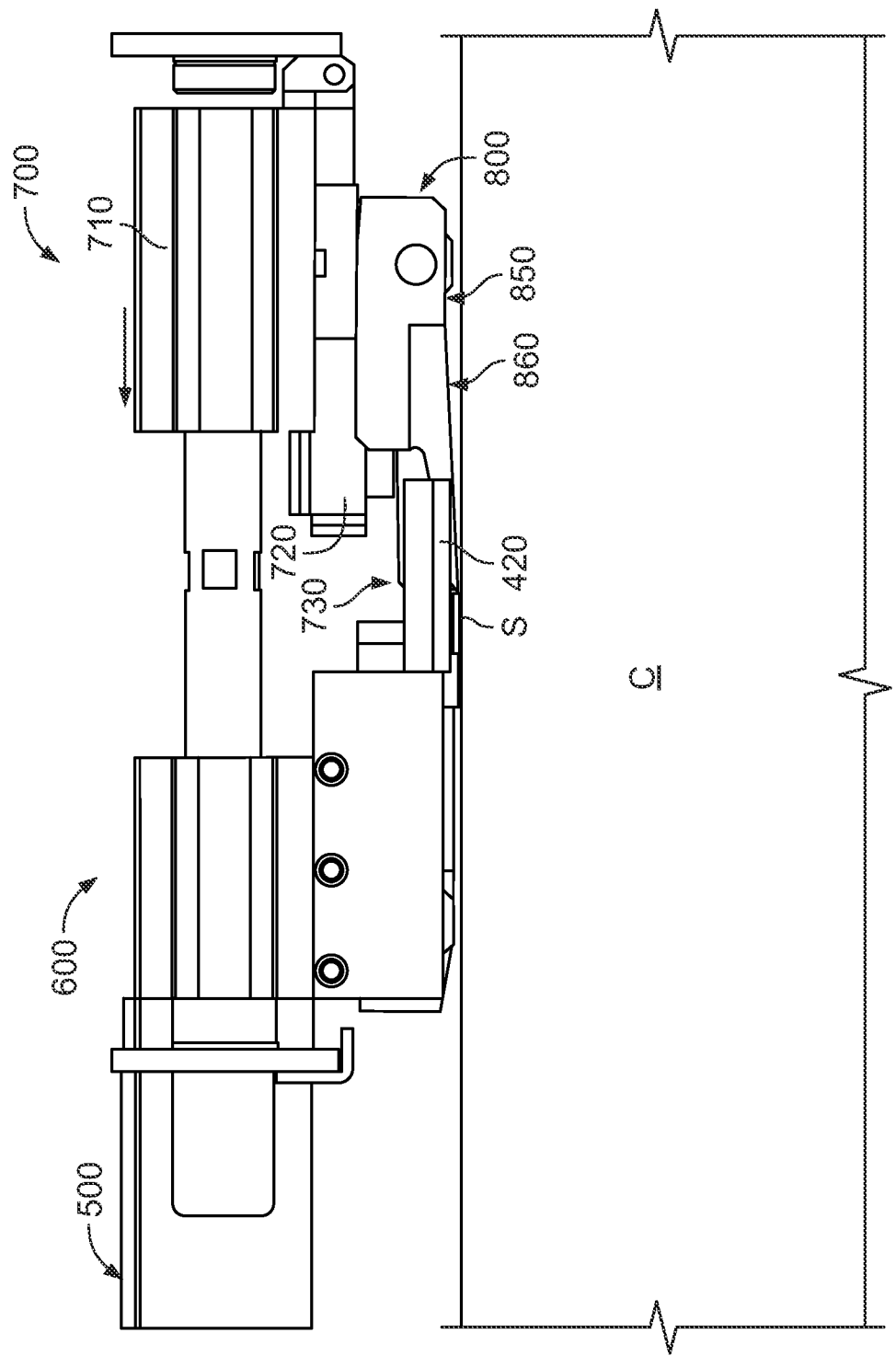
Figure 13A:
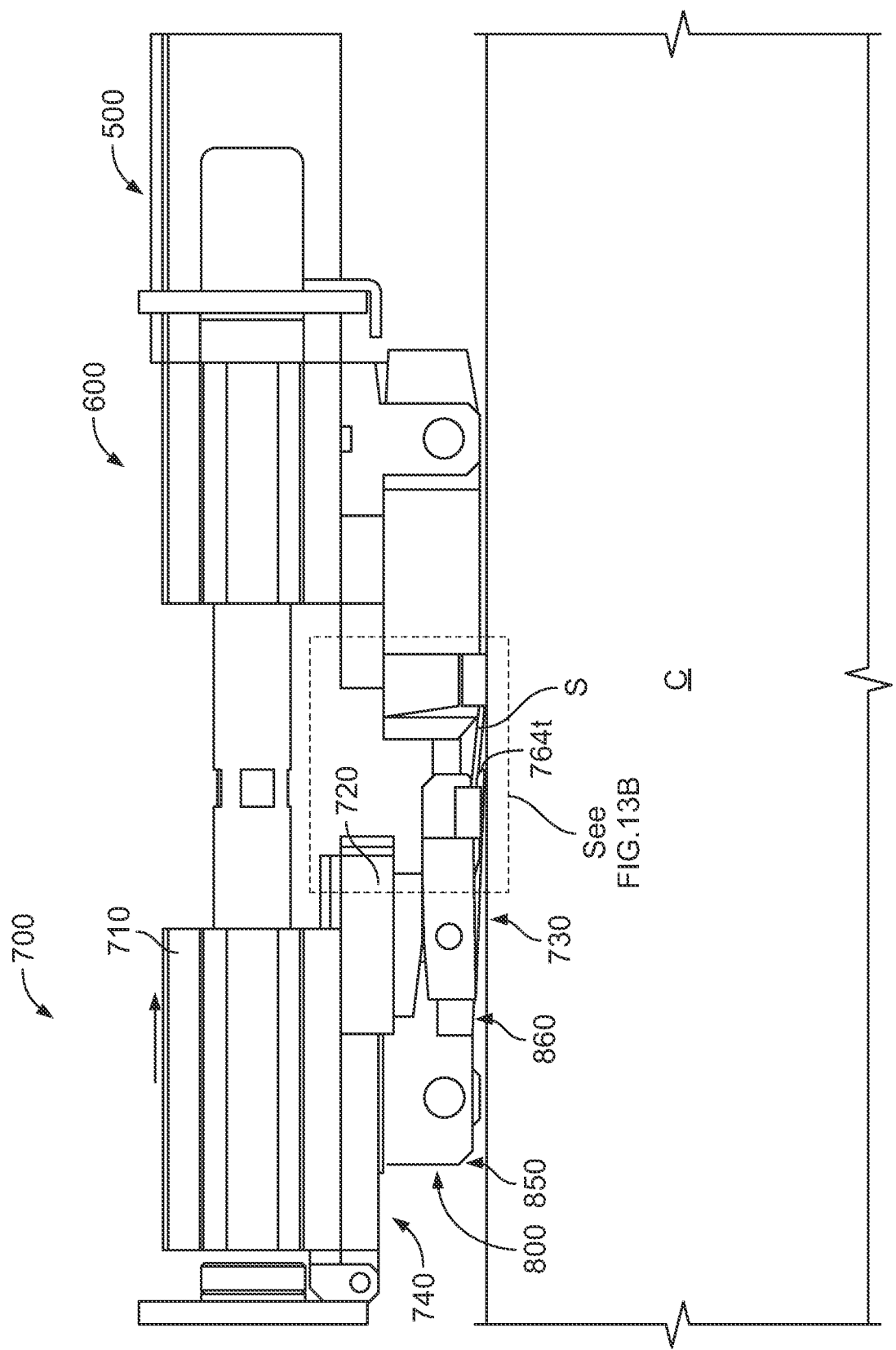
Figure 13B:
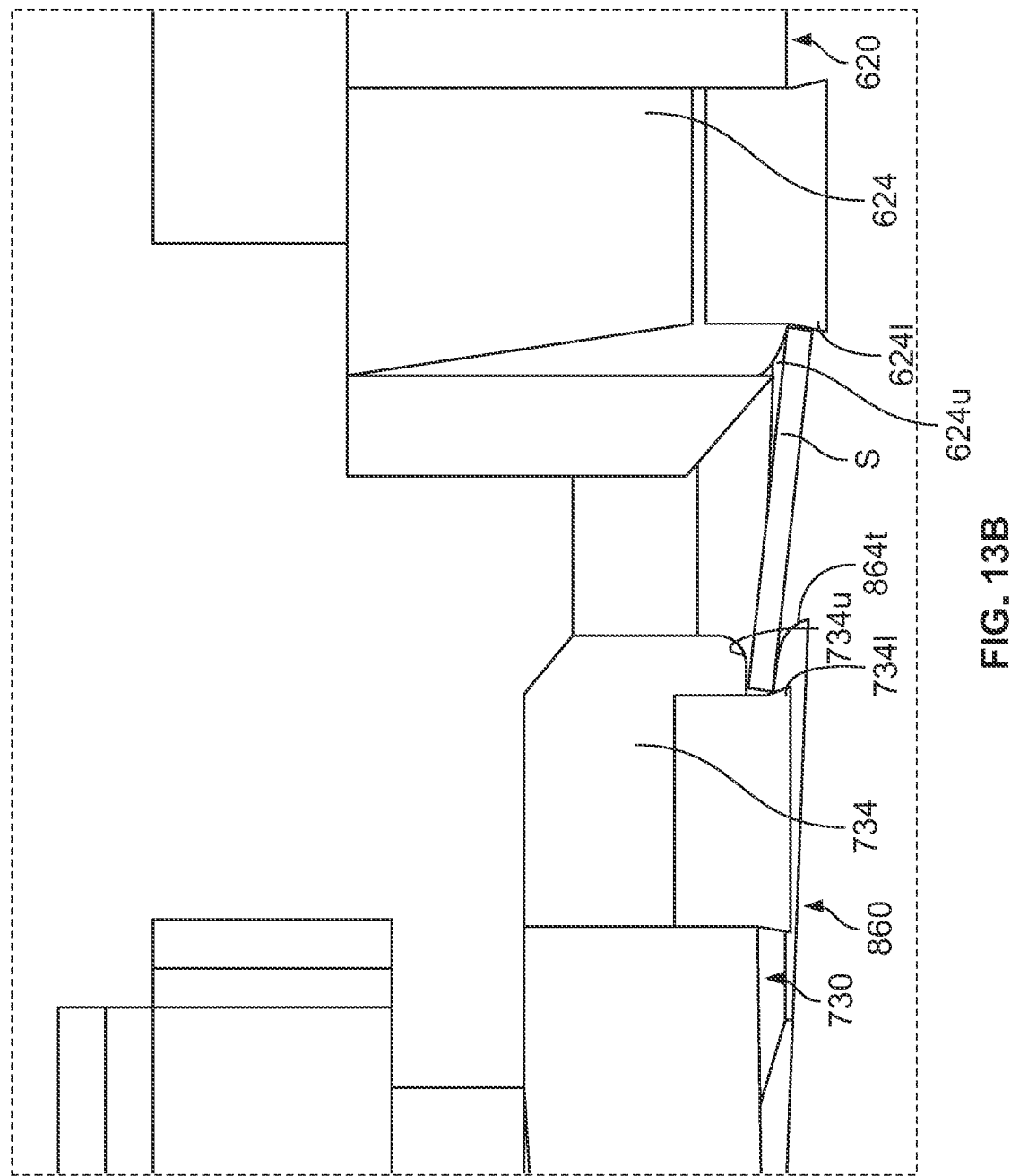

The controller 1000 controls the carriage actuator 500 to move the second carriage 710—which carries the second cutting assembly 800—from its home position toward the strap segment S to clamp the strap segment S and to cut the strap segment S from the coil C. FIGS. 12A-12C show the position of the second carriage 710 just before the third clamp 730 and the second cutter 860 contact the strap segment S. As the second carriage 710 continues moving, the lower lip 7341 of the clamping head 734 of the third clamp 730 and the tip 864t of the lifting-and-cutting head 864 of the second cutter 860 engage and slightly lift the strap segment S into contact with the upper lip 734u such that the side of the strap segment S is received in the mouth of the third clamp 730, as best shown in FIGS. 13A-13C. At this point the strap segment S is clamped between first and second clamps 620 and 630 (on one side) and the third clamp 730 (on the other side).

Figure 14A:
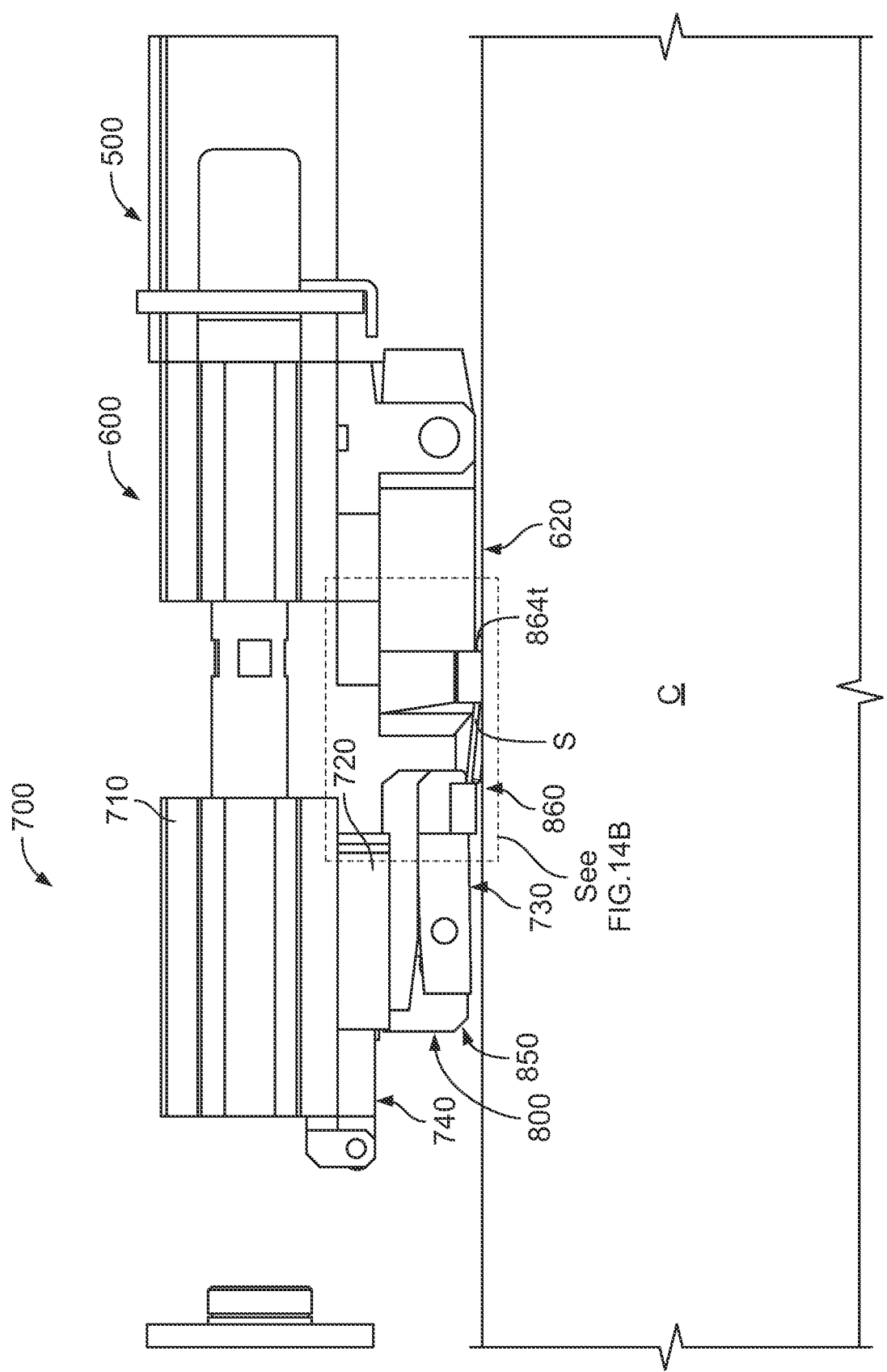
Figure 14B:
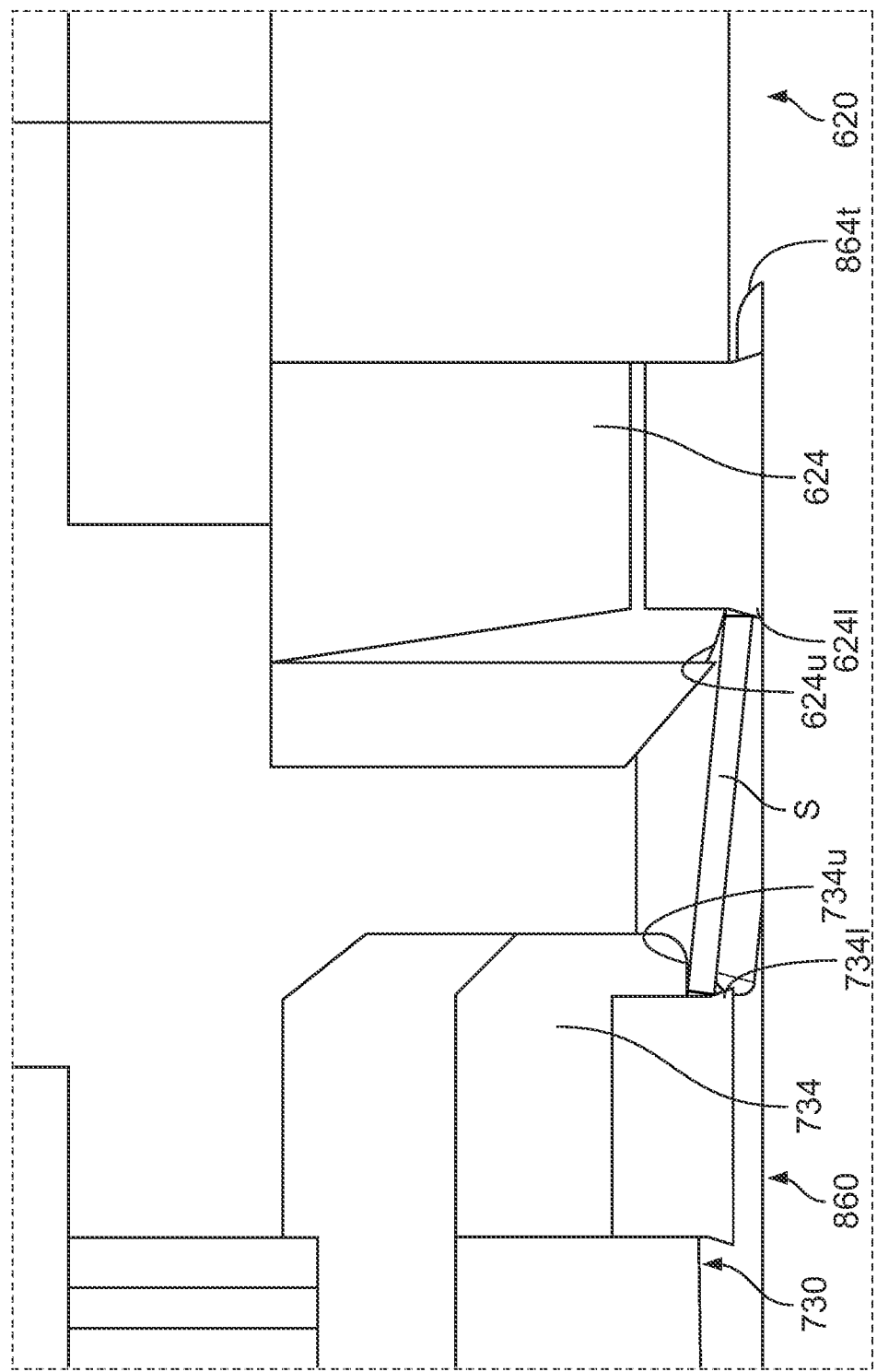
Figure 14C:
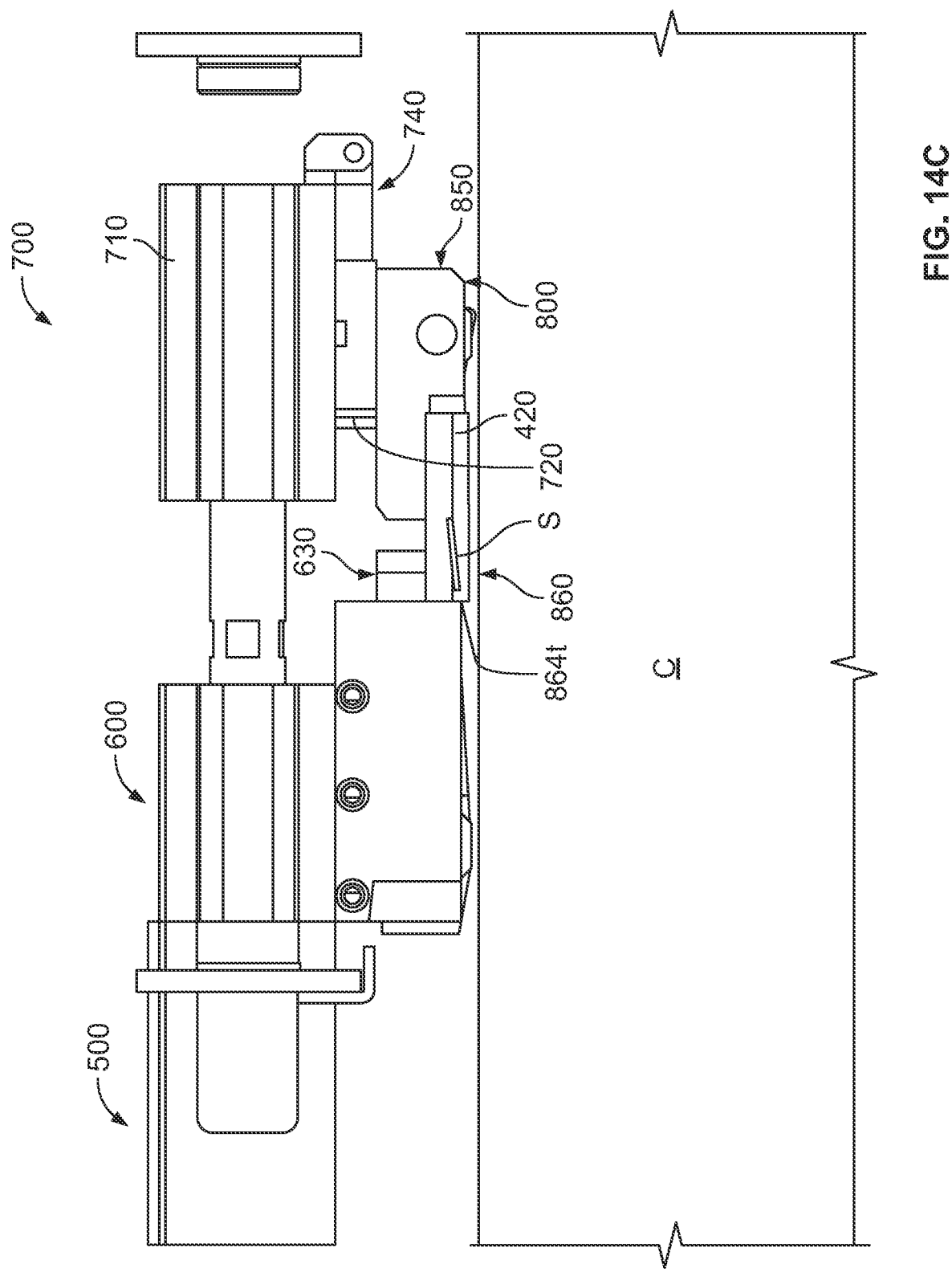

The second carriage 710 continues moving toward the strap segment S, carrying the second cutting assembly 800 and the second cutter 860 with it. The strap segment S and the first and second clamps 620 and 630 prevent the third clamp 730 from continuing to move with the second carriage 710, so continued movement of the second carriage 710 compresses the second-third-clamp-biasing element 740, which increases the clamping force the third clamp 730 imposes on the strap segment S. Specifically, the clamping force is both horizontal (caused by the force imposed by the second-third-clamp-biasing element 740) and vertical (caused by the forces imposed by the biasing elements of the first, second, and third clamps and the geometry of the respective clamping heads). As the second cutting assembly 800 continues to move with the second carriage 710, the lifting-and-cutting head 864 of the second cutter 860 lifts the strap segment S into contact with the first cutting edge 420c of the first cutter 420. Continued movement of the second cutter 860 relative to the strap segment S causes the first and second cutting edges 420c and 864c of the first and second cutters 420 and 860 to cut the strap segment S via a shearing action, as shown in FIGS. 14A-14C. Since the first and second outer clamps 320a and 320b of the first and second strap securers 300a and 300b clamp the strap segment S against the coil C, the cut end of the strap segment S does not uncontrollably fly off of the coil C after cutting.

After the first and second cutters 420 and 860 cut the strap segment S and the second carriage 710 reaches its actuated position, the controller 1000 controls the carriage actuator 500 to stop moving the second carriage 710. At this point the first, second, and third clamps 620, 630, and 730 cooperate to clamp the strap segment S among one another and against the upper surfaces 864a1-864a3 of the head 864 of the second cutter 860. The controller controls the robotic arm actuators 4 to manipulate the robotic arm 2 to move the strap-segment-cutting head 10 (carrying the cut strap segment S with it) to a winder. The controller controls the carriage actuator 500 to control the first carriage 610 and/or the second carriage 710 to move back to their respective home positions. This causes the first, second, and third clamps 730 to release the strap segment S into the winder, which winds the strap segment S for disposal.

The invention claimed is:

1. A strap-segment-cutting system comprising:
   a strap-segment-cutting head comprising:
   a frame;
   a first cutter supported by the frame;
   a first carriage movable relative to the frame between a first-carriage home position and a first-carriage actuated position;
   a first clamp pivotably mounted to the first carriage and comprising a body having a clamping head and an opposing foot;
   a first-clamp biasing element biasing the first clamp to a first-clamp home position in which the clamping head of the first clamp is spaced-apart from the first carriage;
   a second carriage movable relative to the frame and the first cutter between a second-carriage home position and a second-carriage actuated position;
   a second cutter mounted to the second carriage and comprising a body having a lifting-and-cutting head;
   a third-clamp carriage slidably mounted to the second carriage;
   a third clamp pivotably mounted to the third-clamp carriage and comprising a body having a clamping head and an opposing foot;
   a third-clamp biasing element biasing the third clamp to a third-clamp home position in which the clamping head of the third clamp is spaced-apart from the third-clamp carriage; and
   one or more carriage actuators operably connected to the first and second carriages and configured to move the first and second carriages relative to one another from their respective first-carriage and second-carriage home positions in which a first distance separates the first and second carriages to their respective first-carriage and second-carriage actuated positions in which a smaller second distance separates the first and second carriages.

2. The strap-segment-cutting system of claim 1, wherein the second cutter is pivotably mounted to the second carriage, wherein the strap-segment-cutting head further comprises a second-cutter-biasing element biasing the second cutter to a second-cutter home position in which the lifting-and-cutting head of the second cutter is spaced-apart from the second carriage.

3. The strap-segment-cutting system of claim 1, wherein the strap-segment-cutting head further comprises:
   a second clamp pivotably mounted to the first carriage and comprising a body having a clamping head and an opposing foot; and
   a second-clamp-biasing element biasing the second clamp to a second-clamp home position in which the clamping head of the second clamp is spaced-apart from the second carriage.

4. The strap-segment-cutting system of claim 3, wherein the first and second clamps are independently pivotable relative to the first carriage.

5. The strap-segment-cutting system of claim 1, wherein the strap-segment-cutting head further comprises a third-clamp-carriage-biasing element biasing the third-clamp carriage to a home position.

6. The strap-segment-cutting system of claim 1, wherein the clamping head of the first clamp comprises a lower lip and an opposing upper lip that together define a mouth sized to receive a strap segment.

7. The strap-segment-cutting system of claim 1, wherein the first cutter is movable relative to the frame between a first-cutter home position and a first-cutter cutting position, wherein the strap-segment-cutting head further comprises a first-cutter-biasing element biasing the first cutter to the first-cutter home position.

8. The strap-segment-cutting system of claim 7, wherein the strap-segment-cutting head further comprises a first-cutter engager movable with the first carriage and positioned to engage the first cutter and move the first cutter from the first-cutter home position to the first-cutter cutting position as the first carriage moves from the first-carriage home position to the first-carriage actuated position.

9. The strap-segment-cutting system of claim 1, further comprising:
   a robotic arm to which the strap-segment-cutting head is removably mounted;
   one or more robotic arm actuators operably connected to the robotic arm and operable to manipulate the robotic arm to move the strap-segment-cutting head; and
   a controller operably connected to and configured to control the one or more robotic arm actuators and the carriage actuator.

10. A method of removing a strap segment from an object, the method comprising:
    positioning a strap-segment-cutting head so it is spaced apart from the object and adjacent to the strap segment, wherein the strap-segment-cutting head includes a first cutter, a first clamp pivotably mounted to a first carriage, a second cutter pivotably mounted to a second carriage, and a third clamp pivotably mounted to a third-clamp carriage;
    moving the strap-segment-cutting head toward the object to a strap-segment-cutting position such that:
       a clamping head of the first clamp is positioned on a first side of the strap segment and the first clamp engages the object and pivots from a first-clamp home position toward the first carriage;
       a lifting-and-cutting head of the second cutter is positioned on an opposing second side of the strap segment and the second cutter engages the object and pivots from a second-cutter home position toward the second carriage; and
       a clamping head of the third clamp is positioned on the second side of the strap segment and the third cutter engages the object and pivots from a third-clamp home position toward the third-clamp carriage;
    moving a first carriage to which the first clamp is mounted toward the strap segment such that the clamping head of the first clamp engages the first side of the strap segment; and
    moving a second carriage to which the second cutter is mounted toward the strap segment such that the second cutter lifts the strap segment into contact with the first cutter and cooperates with the first cutter to cut the strap segment.

11. The method of claim 10, wherein the strap-segment cutting head further comprises a second clamp pivotably mounted to the first carriage, further comprising moving the strap-segment cutting head to the strap-segment cutting position such that a clamping head of the second clamp is positioned on the first side of the strap segment and the second clamp engages the object and pivots from a second-clamp home position toward the first carriage.

12. The method of claim 10, further comprising moving the second carriage toward the strap segment such that the clamping head of the third clamp engages the second side of the strap segment and cooperates with the clamping head of the first clamp to clamp the strap segment.

13. The method of claim 12, further comprising moving the first cutter from a home position to a cutting position while moving the first carriage toward the strap segment.

14. The method of claim 10, further comprising moving the first cutter from a home position to a cutting position while moving the first clamp toward the strap segment.

15. A strap-segment-cutting system comprising:
- a strap-segment-cutting head comprising:
  - a frame;
  - a first cutter supported by the frame and movable relative to the frame between a first-cutter home position and a first-cutter cutting position;
  - a first carriage movable relative to the frame between a first-carriage home position and a first-carriage actuated position;
  - a first clamp pivotably mounted to the first carriage and comprising a body having a clamping head and an opposing foot;
  - a first-clamp biasing element biasing the first clamp to a first-clamp home position in which the clamping head of the first clamp is spaced-apart from the first carriage;
  - a second carriage movable relative to the frame and the first cutter between a second-carriage home position and a second-carriage actuated position;
  - a second cutter mounted to the second carriage and comprising a body having a lifting-and-cutting head;
  - a first-cutter engager movable with the first carriage and positioned to engage the first cutter and move the first cutter from the first-cutter home position to the first-cutter cutting position as the first carriage moves from the first-carriage home position to the first-carriage actuated position; and
- one or more carriage actuators operably connected to the first and second carriages and configured to move the first and second carriages relative to one another from their respective first-carriage and second-carriage home positions in which a first distance separates the first and second carriages to their respective first-carriage and second-carriage actuated positions in which a smaller second distance separates the first and second carriages.

* * * * *